United States Patent [19]
Nakano et al.

[11] Patent Number: 5,598,389
[45] Date of Patent: Jan. 28, 1997

[54] SIGNAL DETECTOR FOR AN OPTICAL INFORMATION REPRODUCING APPARATUS

[75] Inventors: Junichi Nakano, Hachioji; Hiroshi Ezawa, Sagamihara; Nobuhide Matsubayashi, Hachioji, all of Japan

[73] Assignee: Olympus Optical Co., Ltd., Tokyo, Japan

[21] Appl. No.: 299,699

[22] Filed: Sep. 1, 1994

[30] Foreign Application Priority Data

Sep. 3, 1993 [JP] Japan .................................. 5-220240
Oct. 22, 1993 [JP] Japan .................................. 5-265199
May 19, 1994 [JP] Japan .................................. 6-105778

[51] Int. Cl.$^6$ ............................................................ G11B 7/00
[52] U.S. Cl. ........................ 369/48; 369/59; 369/124
[58] Field of Search ............................... 369/47–48, 54, 369/59, 124; 360/40–41, 46

[56] References Cited

U.S. PATENT DOCUMENTS 5,233,589  8/1993  Saito et al. .............................. 369/59 X
5,377,178  12/1994  Saito et al. .............................. 369/59 X

FOREIGN PATENT DOCUMENTS 63-313335  12/1988  Japan .
2-183471  7/1990  Japan .
5-101396  4/1993  Japan .
5-242608  9/1993  Japan .

OTHER PUBLICATIONS

"Jitter Characteristics of Mark Edge Recording on MO Disks", Journal of the Japanese Society of Applied Magnetism, vol. 16, No. 5, 1992, pp. 694–699.

*Primary Examiner*—W. R. Young
*Attorney, Agent, or Firm*—Armstrong, Westerman, Hattori, McLeland & Naughton

[57] ABSTRACT

Write data, which has been modulated in a 4/11 mode and converted in an NRZI mode, is written on a sample servo type optical disk by means of a magnetic head and a laser diode in a pickup. A signal reproducer in an optical disk unit comprises a differentiating circuit for differentiating a reproduced signal originating from data recorded on the optical disk after detected by the pickup, an A/D converter for sampling a differential signal synchronously with a channel clock, and a difference detector for reproducing data by performing difference detection on results of A/D conversion. The difference detector includes a register, a selector, and a determiner.

16 Claims, 21 Drawing Sheets

SIGNAL DETECTOR FOR AN OPTICAL INFORMATION REPRODUCING APPARATUS

BACKGROUND OF THE INVENTION

1. Field of the Invention

The present invention relates to a signal detector for an optical information reproducing apparatus in which intrinsic marks formed intermittently on an optical recording medium are used to reproduce a channel clock, and information is reproduced synchronously with the channel clock from the optical recording medium on which the information is recorded in the form of marks synchronously with the channel clock by edging each mark responsively to a 1 of record data that has been modulated so that N bits (N is larger than 0 and an integer) in a block serving as a unit of modulation represent 1's, and converted in an NRZI mode.

2. Description of the Related Art

One of techniques of formatting an optical disk designed for an optical disk unit is referred to as a sample servo technique. Sample servo is such that: an information track is divided into a servo field and a data field; a phase-locked loop (PLL) is configured in relation to specific pits, which are called clock pits, formed within the servo field in order to reproduce a channel clock; and information is recorded or reproduced synchronously with the channel clock.

The sample servo technique includes what is called a DBF technique. In the DBF, 4/11 modulation is employed as a method of modulating record data. Herein, one byte is converted into eleven channel bits so that four of the eleven channel bits represent 1's. During reproducing, binary coding can be performed by setting four bits, which signify the largest levels of a reproduced signal, to logical 1. The reproducing technique, which is referred to as difference detection, is characteristic of immunity to degradations in a reproduced signal. Thanks to the immunity to signal degradations, the difference detection has the advantage of being suitable for high-density recording.

A technique for improving recording density for an optical disk is referred to as mark edge recording. Herein, unlike mark position recording based on a principle that a mark position on a disk is associated with a 1, recording or reproducing is such that record data is reversed (NRZI conversion) every time a 1 is detected, and an edge of a mark is associated with a 1. Mark edge recording allows both edges of a mark to have meanings, thus yielding excellent recording efficiency and suiting for high-density recording. However, the aforesaid sample servo-based difference detection technique is supposed to be combined with the mark position recording technique. That is to say, difference detection cannot be effected in combination with mark edge recording, which hinders improvement of recording density.

An art attempting to solve this drawback by combining the sample servo technique with the mark edge recording technique has been disclosed in Japanese Patent Laid-Open No. H5-101396/1993. Herein, a record signal is recorded in the mark edge recording mode. Difference detection is then performed in order to extract four bits signifying the smallest differences between levels of a reproduced signal, which have been sampled synchronously with a channel clock during reproducing, and a mean level thereof. The four bits are regarded as associated with edges of marks and set to 1's.

In the procedure described in the Japanese Patent Laid-Open No. H5-101396/1993, a bit signifying a level of a reproduced signal that is close to a mean level is associated with an edge of a mark and set to logical 1.

However, since an optical disk is fundamentally of a binary recording type, as long as recording or reproducing is performed in an ideal manner, a mean level will not arise. A reproduced signal has a mean level only when an edge of a mark formed on a disk is not read ideally because of a degraded MTF of an optical system or an insufficient bandwidth of a reproducer. A level a reproduced signal has in the vicinity of a mark edge depends greatly on a spacing between marks (line density), an MTF of an optical system, and a bandwidth of a reproducer. These requirements are governed mainly by a difference of an optical system or a circuit in an apparatus from that in other apparatus, a position (inner or outer circumference) on a disk, a type of a disk (medium), and recording conditions. In short, a reproduced signal does not necessarily have a means level at an edge of a mark.

The art described in the Japanese Patent Laid-Open No. H5-101396/1993 poses a detrimental problem in terms of stability in recording or reproducing. It cannot be said that employment of mark edge recording enables high-density recording.

When mark edge recording is effected through light modulation, an edge of a mark formed changes positions depending on recording conditions and eventually brings about a variation in mark length. In mark edge recording in which an edge position is significant, the variation leads directly to a detection error. Correction must therefore be performed during mark recording or reproducing. As for a procedure of such correction, examples are described in "Jitter Characteristics of Mark Recording on MO Disks" (Journal of the Japanese Society of Applied Magnetism, Vol.16, No. 5, 1992) and Japanese Patent Laid-Open No. H2-183471/1990.

In these correction procedures, a change in position of an edge dependent on a pattern of write data itself is corrected during recording, and a variation in length thereof due to a temperature change is corrected during reproducing. In other words, during recording, preceding and succeeding data patterns are taken into consideration in order to control a light emission pattern of a laser. During reproducing, since only a spacing between a leading edge of a mark and a trailing edge thereof changes and a change in position of each edge is limited, leading and trailing edges are manipulated independently. For example, a procedure described in Japanese Patent Laid-Open No. H2-183471/1990 is such that data pulses detected responsively to leading and trailing edges of a mark are fed to synchronizers, independently binary-coded by the synchronizers, and then synthesized.

Even in the combination of difference detection and mark edge recording, when light modulation is employed above all, a change in position of a mark edge is unavoidable. A change in position of a mark edge breaks a positional relationship between a channel clock used for sampling and an edge. Even when difference detection is adopted, a detection error occurs readily.

Since a conventional procedure can be employed for correction during recording, a change in position of an edge dependent on a recording pattern can be suppressed relatively effortlessly. However, there is a difficulty in suppressing a variation in mark length due to a varying ambient temperature in the course of recording-time correction. Even when the difference detection technique is adopted, some correction must be performed during reproducing.

The difference detection technique features that an external clock is used independently of marks formed on a disk, a reproduced signal is sampled synchronously with the clock, and sampled levels are compared with each other (the positions of leading and trailing edges cannot be located until difference detection is performed on a final bit). Leading and trailing edges cannot therefore be distinguished from each other in advance. Unlike the prior art, a procedure of compensating for a variation in mark length by performing temporal correction after detecting leading and trailing edges independently cannot be employed as it is. A margin is diminished by a variation in mark length, which disables high-density recording.

For effecting high-density recording by making the most of an advantage of difference detection, it is understood that a channel clock (a clock used for sampling) must be reproduced correctly so as to coincide with data positions on a disk. Because of various factors including a change in data writing conditions (including a change in ambient temperature), a phase difference is liable to occur between a channel clock reproduced responsively to clock pits and actual data written on a disk.

In an effort to solve this problem, a procedure has been disclosed in, for example, Japanese Patent Laid-Open No. H5-242608/1993. Herein, a reference pattern such as a pattern of a maximum repetition frequency is written at the start of each sector during data writing, and a reproduced signal originating from the pattern is used to optimize the phase of a sampling clock used for difference detection.

However, the procedure of recording a reference pattern such as a maximum repetition frequency pattern at the start of each sector makes it necessary to ensure a field, in which the reference pattern is formed, at the start of each sector. This causes a user-specific field to diminish in area. Eventually, a problem that high-density recording cannot be achieved occurs in handling an entire disk.

In the above procedure, after a clock is phased with the start of a sector, phasing is not carried out within the sector. The clock fails to track a change in data position resulting from uneven sensitivity of a disk within the sector. The phase difference between the clock and data therefore gets larger, causing a read error. Otherwise, this error may become a bottleneck in achieving high-density recording.

OBJECTS AND SUMMARY OF THE INVENTION

An object of the present invention is to provide a signal detector for an optical information reproducing apparatus that realizes more stable data reproducing for high-density recording based on the combination of sample servo and mark edge recording techniques, and that suits for the high-density recording.

Another object of the present invention is to provide a signal detector for an optical information reproducing apparatus in which the position of data on an optical recording medium coincides with the phase of a clock without fail so that data can be read correctly, and higher-density recording or reproducing can be achieved using a margin ensured owing to the unfailing coincidence.

A signal detector for an optical information reproducing apparatus in accordance with the present invention is designed for an optical information reproducing apparatus that reproduces a channel clock responsively to intrinsic marks on an optical recording medium, on which record data, which have been modulated so that the number of 1's in a block or a modulation unit becomes N (N is larger than 0 and an integer) as a result of modulation, and converted in an NRZI mode, are recorded in the form of marks so that an edge of each mark is associated with a 1, and that reproduces record data synchronously with the channel clock. The signal detector has a signal detecting means for detecting a signal that has a peak amplitude responsively to an edge of a mark, a sampling means for sampling an output of the signal detecting means synchronously with the channel clock, and a difference detecting means for selecting N bits signifying the largest absolute values of signal levels from a channel code sampled by the sampling means. Herein, bits signifying the largest amplitudes of a signal that has a peak amplitude responsively to an edge of each mark, which have been detected by the signal detecting means, are set to logical 1. Thus, edges of marks recorded on an optical recording medium are detected correctly. This enables high-stability reproducing of information recorded at high density.

Other features and advantages of the present invention will be apparent from the description below.

BRIEF DESCRIPTION OF THE DRAWINGS

FIG. 1 is a block diagram showing circuit elements of a signal reproducer;

FIG. 2 is a block diagram showing components of an optical disk unit having the signal reproducer shown in FIG. 1;

FIG. 3, including subparts (a)–(m), is a timing chart for explaining the operation of the signal reproducer shown in FIG. 2;

FIG. 4 is a block diagram showing circuit elements of a signal reproducer;

FIG. 5, including subparts (a)–(l), is a timing chart for explaining the operation of the signal reproducer shown in FIG. 4;

FIG. 6 is a block diagram showing circuit elements of a signal reproducer;

FIG. 7, including subparts (a)–(r), is a timing chart for explaining the operation of the signal reproducer shown in FIG. 6;

FIG. 8 is a block diagram showing circuit elements of a signal reproducer;

FIG. 9, including subparts (a)–(r), is a timing chart for explaining the operation of the signal reproducer shown in FIG. 8;

FIG. 10, including subparts (a)–(f), is a timing chart for explaining the operation of a signal reproducer;

FIG. 11 shows components of an optical system for optically generating a differential signal;

FIG. 12 is a block diagram showing circuit elements of a signal reproducer;

FIG. 13 is a block diagram showing an optical disk unit having the signal reproducer shown in FIG. 12;

FIG. 14, including subparts (a)–(k), is a timing chart for explaining the operation of the signal reproducer shown in FIG. 12;

FIG. 15, including subparts (a)–(g), is a timing chart for explaining a procedure of phasing a LCHCLK signal produced by the signal reproducer shown in FIG. 12;

FIG. 16 shows components of a signal reproducing apparatus;

FIG. 17 iS a block diagram showing circuit elements of a difference detector shown in FIG. 16;

FIG. 18, including subparts (a)–(k), is a timing chart for explaining the operation of the signal reproducing apparatus shown in FIG. 16;

FIG. 19 shows components of a signal reproducing apparatus;

FIG. 20 is a block diagram showing circuit elements of a difference detector; and FIG. 21, including subparts (a)–(p), is a timing chart for explaining the operation of the signal reproducing apparatus shown in FIG. 19.

DETAILED DESCRIPTION OF THE PREFERRED EMBODIMENTS

Figure 1:
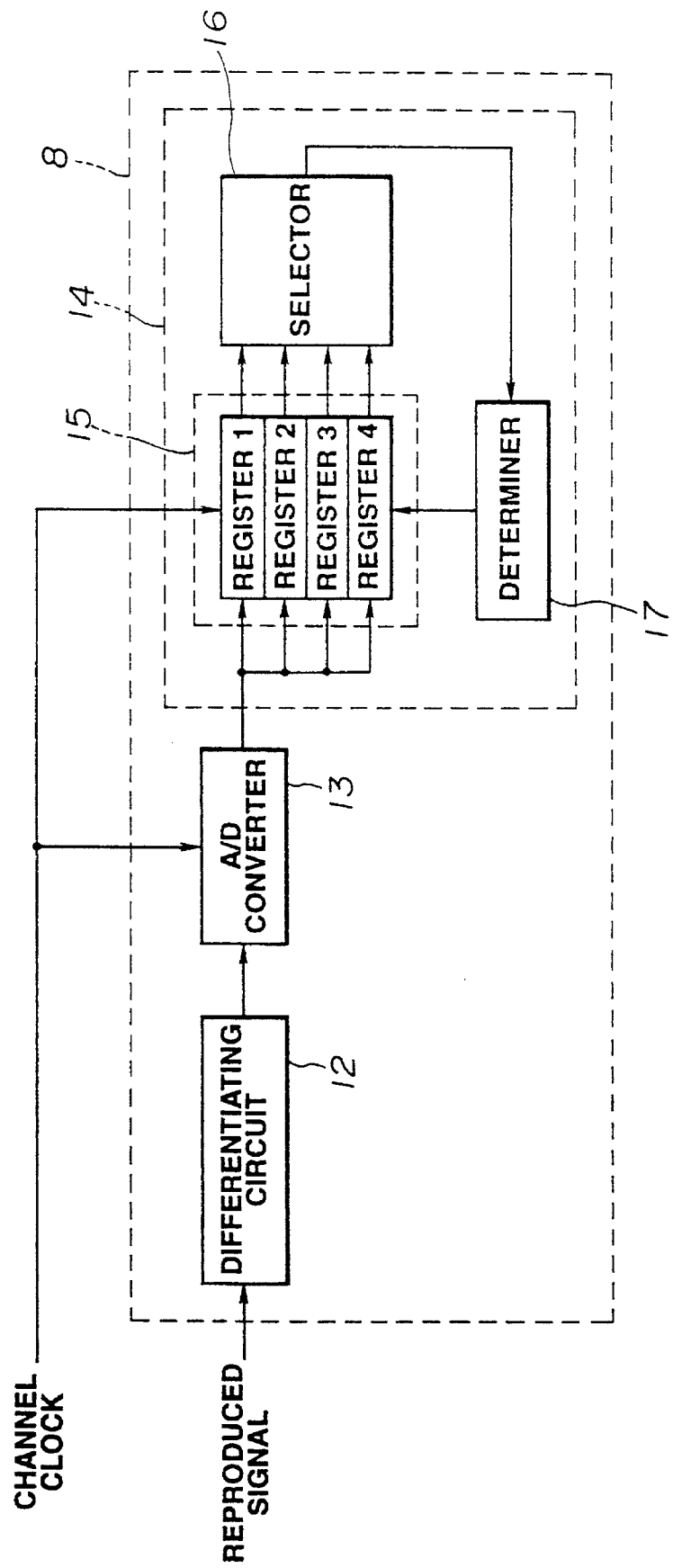
FIGS. 1 to 3 relates to the first embodiment of the present invention.

Referring to the drawings, embodiments of the present invention will be described below.

In the first embodiment, 4/11 modulation to be combined with the DBF technique is employed as a modulation technique, and magneto-optical recording is carried out.

Figure 2:
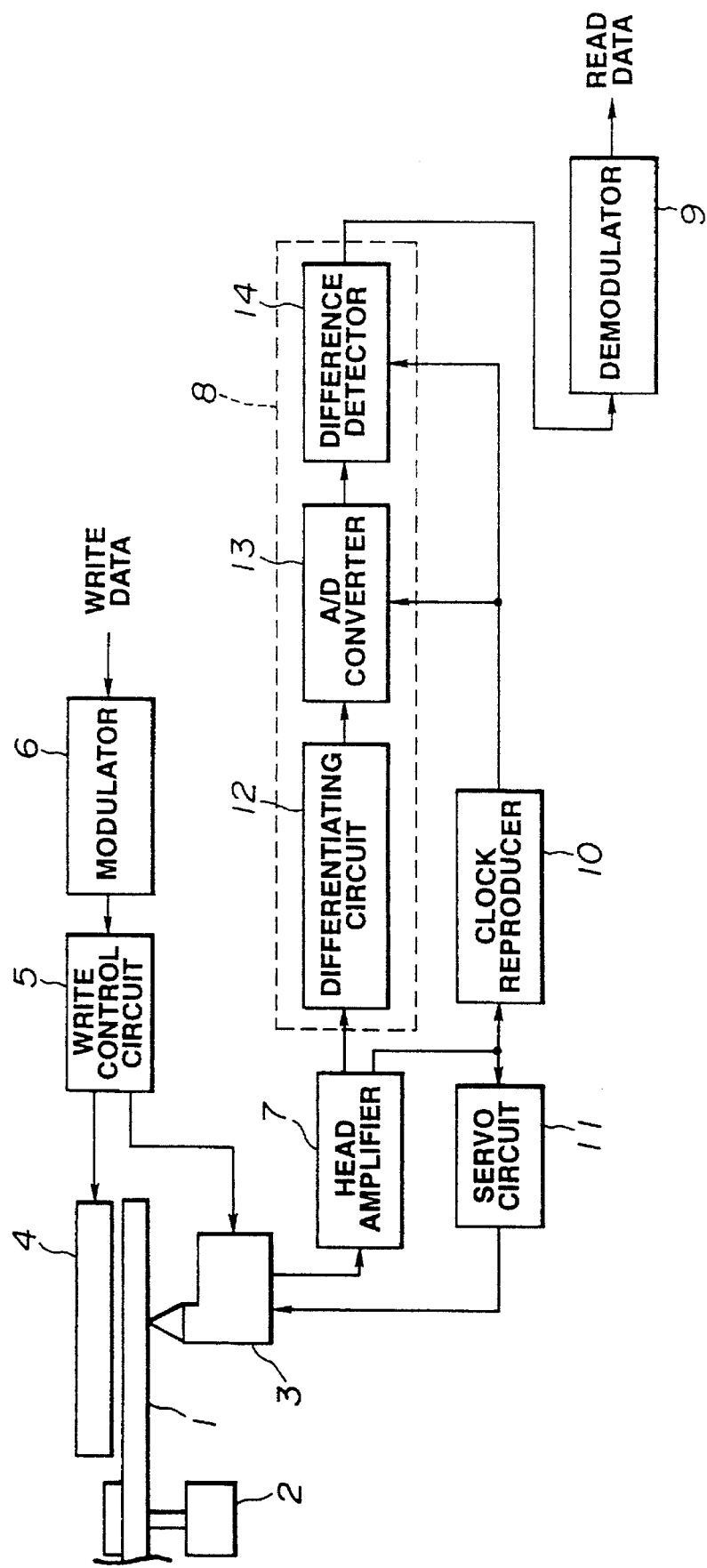

In an optical disk unit having a signal reproducer of the present invention, as shown in FIG. 2, a motor 2 causes an optical disk 1 of a sample servo type to rotate at a predetermined rate of revolutions per second. A pickup 3 irradiates laser light to the optical disk 1 and detects light reflected from the optical disk 1. A magnetic head 4 applies a predetermined magnetic field to the optical disk 1 during writing or erasing. A write control circuit 5 controls the magnetic head 4 and a laser diode in the pickup 3 so as to write data on the optical disk 1. A modulator 6 modulates write data sent from a high-order controller in a 4/11 mode, converts the modulated data in an NRZI mode, and then outputs a write signal to the write control circuit 5. A head amplifier 7 performs photoelectric transformation and amplification on reflected light detected by the pickup 3. A signal reproducer 8 reproduces original record data using a signal sent from the head amplifier 7. A demodulator 9 demodulates reproduced data in the 4/11 mode, and sends read data to the high-order controller. A clock reproducer 10 extracts a pattern associated with clock pits on the optical disk 1 from a reproduced signal sent from the head amplifier 7, multiplies the pattern using a PLL, and reproduces a channel clock. A servo circuit 11 detects various error signals and controls focusing and/or tracking of the pickup 3 as well as seeking.

Arts for controlling rotation of the optical disk 1, reproducing a channel clock, recording or erasing data, detecting an error signal, and servo controlling a pickup are already known, of which detailed description will be omitted here.

As shown in FIG. 1, the signal reproducer 8 comprises a differentiating circuit 12 for differentiating a reproduced signal, an A/D converter 13 for sampling a differential signal synchronously with a channel clock, a difference detector 14 for performing difference detection on results of A/D conversion and reproducing data. The difference detector 14 comprises a register 15, a selector 16, and a determiner 17. Actions of the difference detector 14 will be described later.

Figure 3:
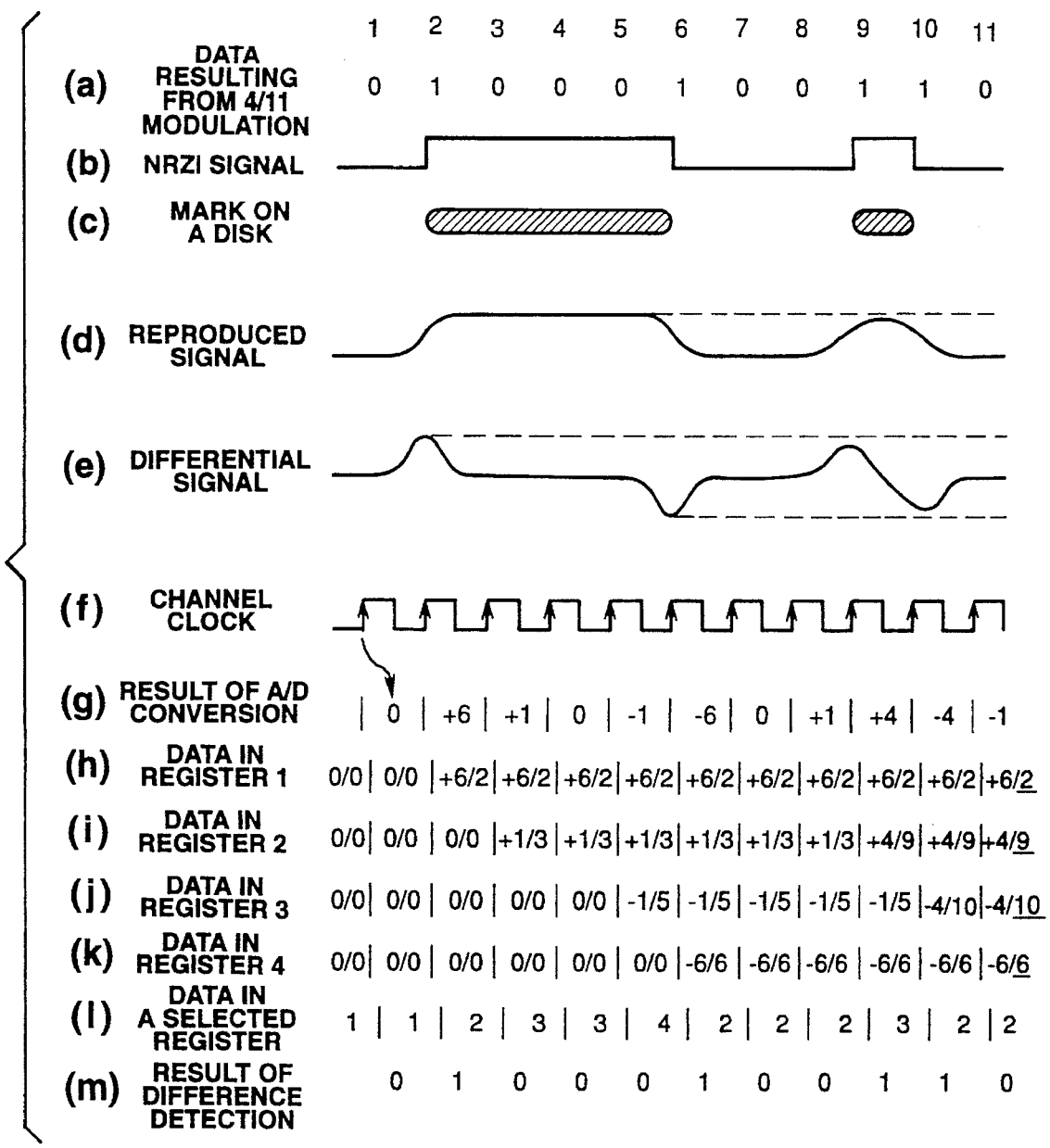

The actions of the signal reproducer 8 having the foregoing circuit elements will be described. Assume that a 11-channel bit code of certain write data resulting from 4/11 modulation performed by the modulator 6 is plotted like FIG. 3a. In conventional pit position recording, data is recorded by forming a mark on the optical disk 1 responsively to a 1 in FIG. 3a. In mark edge recording, however, NRZI conversion where a 1 is indicated with a reversion of a signal is adopted. A signal resulting from NRZI conversion (FIG. 3b) acts as a write signal to be fed to the optical disk 1. Marks shown in FIG. 3c are formed on the optical disk. The marking may be such that a magnetic field is applied externally to a magneto-optical disk in a write direction, and a laser beam is irradiated intensely to a portion of the disk in which a mark should be formed, or alternatively, a laser beam is emitted pulsatively to the portion thereof synchronously with a clock.

During reproducing, a laser beam is irradiated to the optical disk 1 with power smaller than that during writing. The pickup 3 detects the marks shown in FIG. 3c optically. The head amplifier 7 then yields a reproduced signal. Since the diameter of a spot formed by a laser beam for use in reading is not infinitesimal, a resultant reproduced signal has, as shown in FIG. 3d, a wave rounded responsively to edges of marks.

The reproduced signal is differentiated by the differentiating circuit 12, which yields a differential signal in FIG. 3e. The A/D converter 13 converts the differential signal into a digital form synchronously with a channel clock (FIG. 3f) reproduced by the clock reproducer 10. When the A/D conversion is performed in units of signed four bits, a decimal value ranging from −8 to +7 results from conversion. Herein, a zero level of a differential signal is associated with 0, a maximum level (largest positive level) is associated with +7, and a minimum level (largest negative level) is associated with −7. A/D conversion of the differential signal in FIG. 3e results in values in FIG. 3g.

The difference detector 14 performs difference detection on the results of the A/D conversion; that is, detects four bits signifying the four largest absolute values of signal levels. The register 15 in the difference detector 14 is composed of a set of four identical registers. Each of the registers can store a result of A/D conversion performed on a differential signal (which shall, hereinafter, refer to as amplitude data) and a bit position signifying the amplitude data (which shall, hereinafter, refer to position data) in a pair. The selector 16 searches for a register holding amplitude data that represents the smallest absolute value among all the four registers, and outputs information indicating which register holds the smallest value and the held value to the determiner 17. The determiner 17 compares amplitude data representing the smallest absolute value, which has been sent from the selector 16, with a latest result of A/D conversion sent from the A/D converter 13. When the result of A/D conversion has a larger absolute value than the amplitude data, the contents of the register selected by the selector 16 is updated with the latest result of A/D conversion and position data. The above operation is repeated, whereby amplitude data and their position data, which correspond to four bits signifying largest amplitudes of a differential signal, remain in the register 15.

When the register is initialized immediately before a delimiter for one byte (block) starts, if the register is referenced at the end of the block in order to check position data, bit positions signifying the largest amplitudes of a differential signal; that is, edge positions of marks on an optical disk can be identified. The bits are set to logical 1, whereby data modulated in a 4/11 mode can be read out.

As A/D conversion results in values shown in FIG. 3g, the contents of the registers (indicated in the form of amplitude data/position data) change as shown in FIGS. 3h to 3k. After the eleventh bit of a channel code has been handled, four position data of 2, 9, 10, and 6 are present in the registers. The bits indicated with the position data are set to logical 1, thus completing binary coding. For example, when the ninth bit of the channel code is handled, the register 2 containing a value +1 is selected as a register containing the smallest absolute value of a signal level (FIG. 3l). Since the result of A/D conversion corresponding to the ninth bit is +4, the contents of the register 2 are exchanged for +4. After the exchange, the register 3 containing −1 is selected as a register containing the smallest absolute value.

In this embodiment, during initialization, all the registers are reset to 0's; that is, 0's are written as amplitude and position data respectively in all the registers. When a plurality of registers have amplitude data indicating the same absolute value of a signal level, the selector 16 selects a register bearing a smaller number.

According to the present embodiment, when marks, in the form of which record data modulated in a 4/11 mode providing four 1's for one byte are recorded using a mark edge recording technique, are to be reproduced, difference detection is performed in order to extract four bits signifying the largest amplitudes of a differential signal of a reproduced signal, and thus binary coding is achieved. Data recorded by mark edge recording can therefore be reproduced correctly.

The present invention can apply to any recording technique (for example, phase change recording) other than the magneto-electric recording technique without any modification. The present invention can also apply to any modulation technique other than the 4/11 modulation technique as long as a block giving a delimiter of modulation contains a certain number of 1's resulting from modulation. Even when an optical disk is not formatted in a sample servo mode but in a typical continuous servo mode, if marks serving as references are formed on the optical disk so that a channel clock can be reproduced using the marks as references, the present invention can apply.

Next, the second embodiment will be described. The second embodiment differs from the first embodiment in the circuitry of a signal reproducer. Components identical to those in the first embodiment will be assigned the same reference numerals, of which description will be omitted.

In prior arts, difference detection is such that four bits signifying values having the smallest differences from a predetermined reference (mean) value are extracted and set to logical 1. In this case, computation is needed to calculate an absolute value of a difference from the reference value. This poses a problem that the difference detector becomes big in scale. The second embodiment provides a signal reproducer capable of reproducing data on a stable basis despite a simple circuitry.

Figure 4:
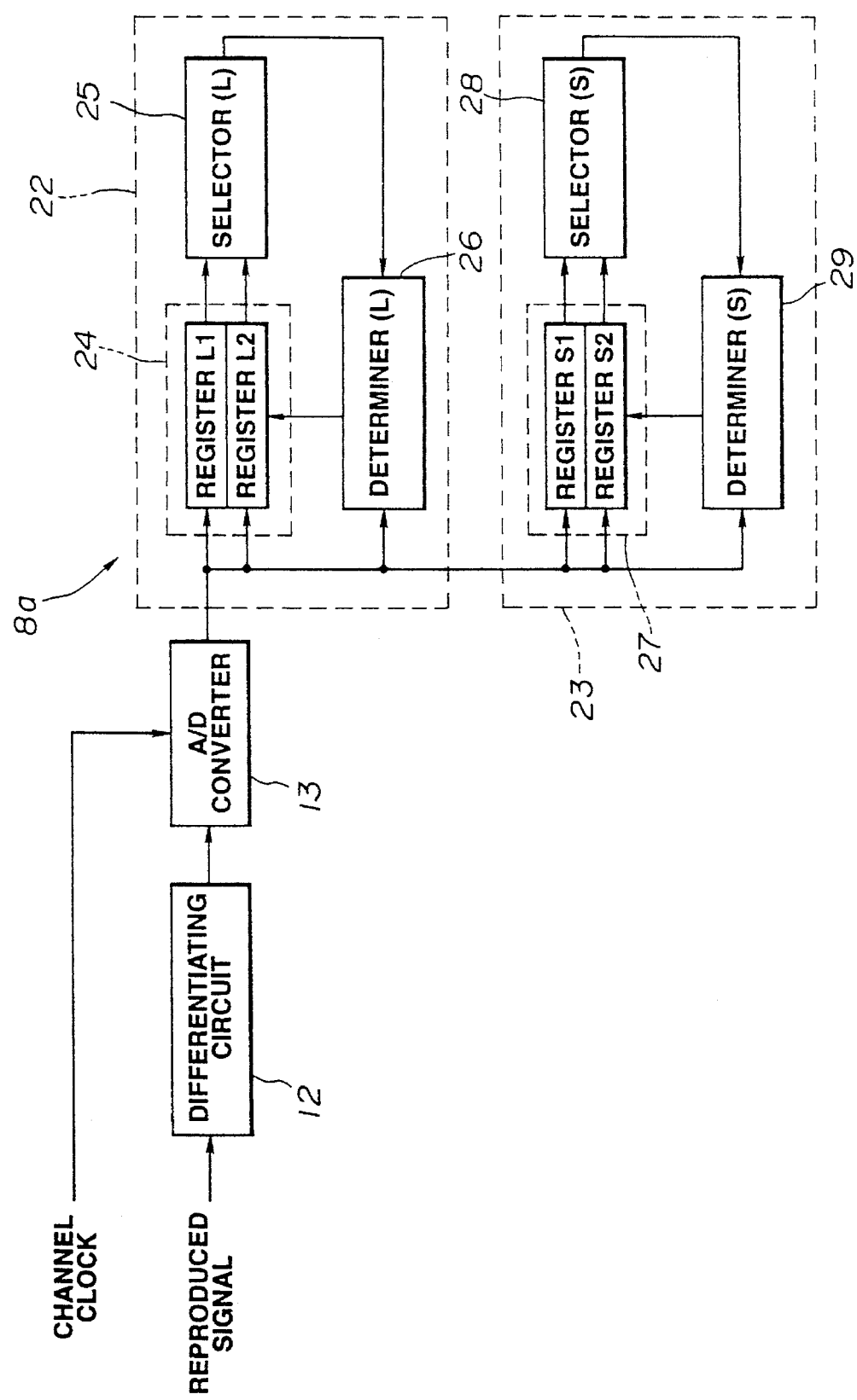
FIGS. 4 and 5 relate to the second embodiment.

A signal reproducer 8a shown in FIG. 4 comprises a first difference detector 22 for detecting two bits, which signify the largest values provided as results of A/D conversion performed by the A/D converter 13, in a block serving as a unit of modulation, and a second difference detector 23 for detecting two bits signifying the smallest values provided as results of A/D conversion. The first difference detector 22 comprises a resister 24, a selector 25, and a determiner 26. Likewise, the second difference detector 23 comprises a register 27, a selector 28, and a determiner 29.

The A/D converter 13 converts an output of the differentiating circuit 12 in units of four bits into a digital form. Each of the registers 24 and 27 can store two pairs of a value provided as a result of A/D conversion and as a bit position signifying the value.

The operation of the signal reproducer 8a having the foregoing circuit elements will be described in conjunction with FIG. 5. Assume that the result of converting certain record data into a channel code composed of 11 bits through 4/11 modulation is plotted as shown in FIG. 5a. According to conventional pit position recording, a mark is formed on the optical disk 1 responsively to a 1 in FIG. 5a. In mark edge recording, however, a 1 is represented by reversing in polarity a signal; that is, NRZI conversion is performed. A signal (FIG. 5b) resulting from NRZI conversion serves as a write signal to be fed to the optical disk 1. Marks shown in FIG. 5c are then formed on the optical disk 1. The marking is such that a magnetic field is applied externally to a magneto-optical disk and a portion of the disk in which a mark should be formed is irradiated with a powerful laser beam.

During reproducing, a laser beam that is less powerful than that during writing is irradiated to the optical disk 1 in order to optically detect the marks shown in FIG. 5c. The result of detection is photoelectrically transformed, thus providing a reproduced signal. Since the diameter of a spot of a laser beam used for reading is not infinitesimal, a resultant reproduced signal has a wave rounded responsively to edges of marks as shown in FIG. 5d.

The reproduced signal is differentiated by the differentiating circuit 12, which yields a differential signal shown in FIG. 5e. The differential signal is converted into a digital form synchronously with a channel clock (FIG. 5f) reproduced responsively to clock pits on the optical disk 1. When A/D conversion is performed in units of four bits, a decimal number ranging from 0 to 15 is obtained as a result of the conversion. In this embodiment, a zero level of the differential signal is associated with 8, a maximum level (largest positive level) thereof is associated with 15, and a minimum level (largest negative level) thereof is associated with 0. The differential signal in FIG. 5e is converted into a digital form under the above conditions, thus yielding the values in FIG. 5g.

The first difference detector 22 performs difference detection on the results of the A/D conversion so as to detect two bits signifying the largest values provided as results of the A/D conversion. The second difference detector 23 performs difference detection so as to detect two bits signifying the smallest values provided as results of the A/D conversion.

The register 24 in the first difference detector 22 is composed of two registers L1 and L2 (hereinafter, registers storing the largest values may bear a letter L, and registers storing the smallest values may bear a letter S). Each of the registers can store in a pair a value provided as a result of A/D conversion performed on a differential signal (hereinafter, referred to as amplitude data) and a bit position signifying the value (hereinafter, referred to as position data). The selector 25 checks which of the registers L1 and L2 contains a smaller value as amplitude data, and then outputs information indicating which of the registers holds a smaller value and the value to the determiner 26.

Table 1a is a truth table describing actions of the selector 25 for selecting a register that stores a smaller value. Table 1b is a truth table describing actions of the selector 28 for selecting a register that stores a larger value.

TABLE 1a

| L1 ≦ L2 | Register to be selected |
|---|---|
| 0 | L2 |
| 1 | L1 |

TABLE 1b

| S1 ≦ S2 | Register to be selected |
|---|---|
| 0 | S2 |
| 1 | S1 |

The determiner 26 compares amplitude data of a smaller value sent from the selector 25 with a latest result of A/D conversion sent from the A/D converter 13. When the result of A/D conversion is larger, the contents of the register holding the amplitude data of a smaller value are updated with the latest result of A/D conversion (amplitude data) and its position data. This operation is performed repeatedly. Finally, amplitude data and their position data, which correspond to two bits signifying the largest levels of a differential signal, are left in the register 24. The same applies to the second difference detector 23. Amplitude data and their position data, which correspond to two bits signifying the smallest levels of the differential signal, are left in the register 23.

Table 2a is a truth table describing actions of the determiner 26 in the first difference detector 22 for detecting a larger value. Table 2b is a truth table describing actions of the determiner 29 in the second difference detector 23 for detecting a smaller value. X in the tables means "Do not care about it."

TABLE 2a

| Result of A/D conversion > selector output | L1 ≦ L2 | Register to be updated |
|---|---|---|
| 0 | X | No update |
| 1 | 0 | L2 |
| 1 | 1 | L1 |

TABLE 2b

| Result of A/D conversion < selector output | S1 ≧ S2 | Register to be updated |
|---|---|---|
| 0 | X | No update |
| 1 | 0 | S2 |
| 1 | 1 | S1 |

Immediately before a delimiter for one byte (block) starts, registers are initialized. At the end of the block, the position data in the registers are referenced. Thus, positions of bits signifying the largest levels of a differential signal and those signifying the smallest levels thereof; that is, positions of edges of marks on an optical disk can be identified. The bits are then set to logical 1, whereby data modulated in a 4/11 mode is read out.

As A/D conversion results in values shown in FIG. 5g, the contents of the registers (indicated in the form of amplitude data / position data) vary as indicated in FIGS. 5h to 5k. When the final 11th bit of a channel code has been handled, four position data of 9, 2, 10, and 6 are present in the respective registers. Four bits indicated with the position data are set to logical 1, whereby binary coding is completed. During initialization, 0 is written as amplitude data and position data in the registers L1 and L2 in the difference detector 22. 15 is written as amplitude data in the registers S1 and S2 in the difference detector 23, and 0 is written as position data therein. When the registers L1 and L2 (or S1 and L2) contain the same amplitude data, the selector selects the register L1 or S1 as a higher priority.

As mentioned above, according to the present embodiment, when marks, in the form of which record data modulated in a 4/11 modulation mode providing four 1's for one byte is recorded using a mark edge recording technique, is to be reproduced, difference detection is performed in order to extract two bits signifying the largest levels of a differential signal of a reproduced signal as well as two bits signifying the smallest levels thereof. Thus, binary coding is achieved. If only a difference detector having a simple circuitry is available, data recorded by mark edge recording can be reproduced correctly.

Even when another modulation method is employed, as long as the modulation method provides an even number of 1's for each block giving a delimiter of modulation, once the number of registers in a difference detector is modified, the present invention can be applied.

Next, the third embodiment of the present invention will be described.

In the second embodiment, two bits signifying the largest levels of a differential signal and two bits signifying the smallest levels thereof are searched for in order to achieve binary coding. In reality, as apparent from FIG. 5e, a differential signal has maximum and minimum levels alternately. By making the most of the alternation, edges of marks can be detected correctly and a margin can be widened accordingly. An example will be described as the third embodiment.

Figure 6:
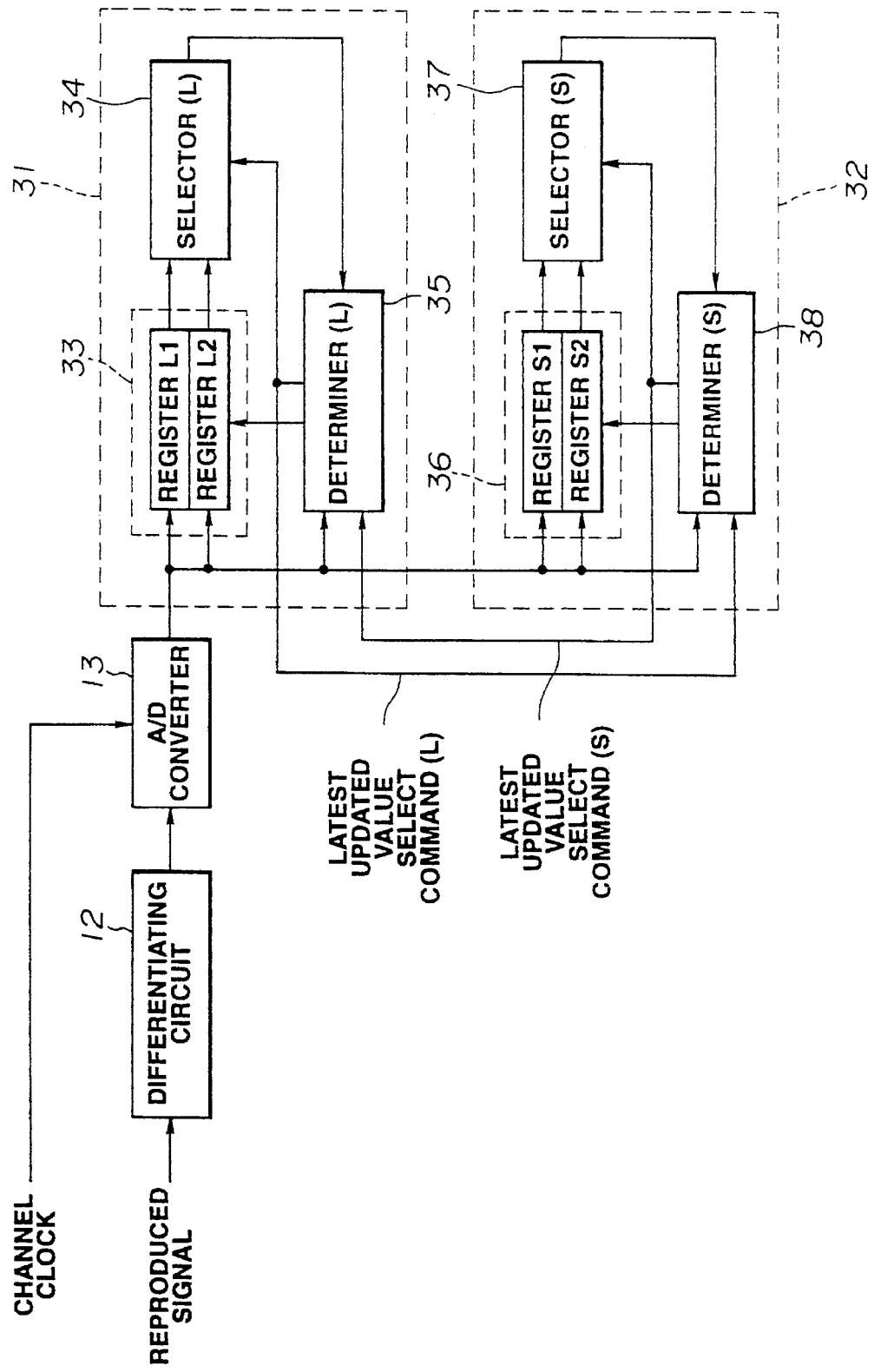
FIGS. 6 and 7 relate to the third embodiment.

In the third embodiment, difference detectors 31 and 32 shown in FIG. 6 are included in place of the difference detectors 22 and 23 in the second embodiment. In the difference detectors 31 and 32, the registers 33 and 36 are identical to those in the second embodiment, but the selectors 34 and 37 as well as the determiners 35 and 38 have slightly difference functions.

Figure 7:
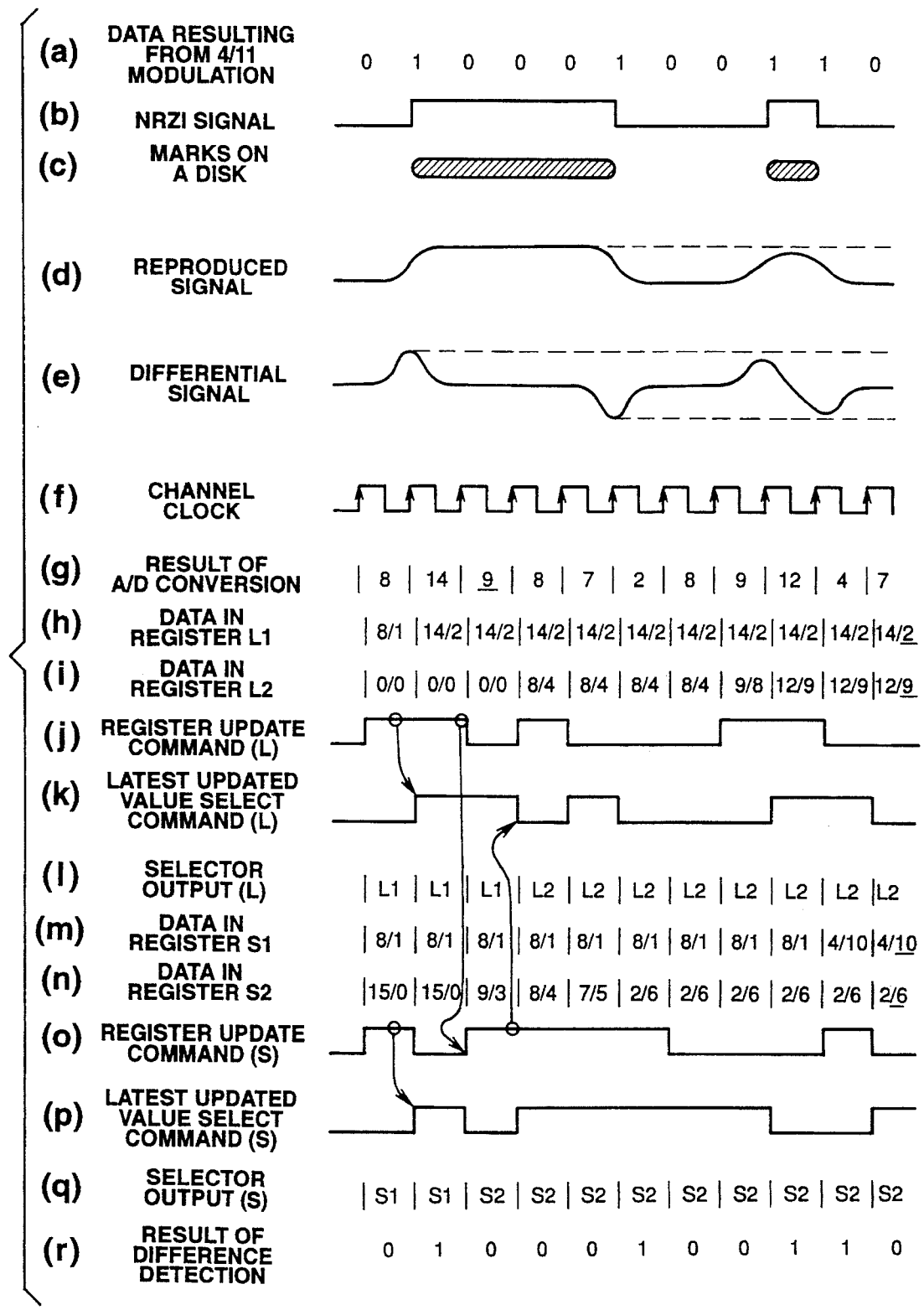

FIG. 7 shows actions of circuit elements. Actions of circuit elements yielding the results of A/D conversion shown in FIG. 7g are identical to those in the second embodiment described in conjunction with FIG. 5. On the assumption that the results of A/D conversion have the same values as those shown in FIG. 5, the third embodiment will be discussed.

The selector 34 (37) responsible for difference detection in the third embodiment, which is shown in FIG. 6, operates so as to select last-updated amplitude data as data to be compared with a result of A/D conversion in place of amplitude data representing a smaller (larger) one of the values contained in the registers for a duration after the register 33 (36) is updated until the register 36 (33) is updated next. After a maximum (minimum) value stored in the register has been updated, until a minimum (maximum) value is updated next, the maximum (minimum) value is used as an object of comparison performed by the determiner 35 (38). This obviates the necessity of selecting a bit signifying the second largest signal level (leaving the bit as a result of difference detection). Consequently, the results of difference detection are represented by alternating a bit signifying amplitude data having the largest value (maximum level) and a bit signifying amplitude data having the smallest value (minimum level).

Each of the determiners in the third embodiment not only selects a register to be updated but also produces a latest updated value select command signal and a selected register designation signal. A truth table describing actions taken in determining a register to be updated is identical to Table 2. Table 3 is a truth table listing values specified in the latest updated value select command signal and selected register designation signal. The truth table is concerned with the determiner (L) 35 in the first difference detector 31 for searching for a larger value. A truth table concerned with the determiner (S) 38 in the second difference detector 32 is identical to Table 3 except that the relationships between magnitudes as well as the relationships between L registers and S registers are inverse. Depending on whether or not register update has been performed immediately before or which register has been updated during the register update, values to be specified in the latest updated value select command signal and selected register designation signal are determined.

TABLE 3

| L register to be updated | Register updated | S register to be updated | Latest updated value select command | Selected register designation signal |
|---|---|---|---|---|
| 0 | X | 0 | unchanged | unchanged |
| 0 | X | 1 | 0 | X |
| 1 | L1 | X | 1 | L1 |
| 1 | L2 | X | 1 | L2 |

Table 4 is a truth table describing actions of the selector (L) 34. A truth table describing actions of the selector (S) 37 is identical to Table 4 except that the relationships between magnitudes as well as the relationships between L registers and S registers are inverse.

TABLE 4

| Latest updated value select command | Selected register designation signal | L1 < L2 | Register to be selected |
|---|---|---|---|
| 0 | X | 0 | L2 |
| 0 | X | 1 | L1 |
| 1 | L1 | X | L1 |
| 1 | L2 | X | L2 |

Actions of the first difference detector 31 for selecting two bits signifying the largest signal levels will be described more particularly. The selector 34 selects, in principle, the register L1 or L2 whichever holds a smaller value as amplitude data. When the determiner 35 outputs a latest updated value select command, the selector 34 operates to select a register whose contents are updated last. After updating either of the registers, the determiner 35 starts outputting a latest updated value select command. When either of the registers in the second difference detector 32 for selecting two bits signifying the smallest signal levels is updated, the latest updated value select command is released. That is to say, the latest updated value select command signal is reset with update of the register 33 in the first difference detector or with update of the register 36 in the second difference detector. The same applies to the second difference detector 32. However, expressions concerning magnitudes in the above description should read inversely.

FIG. 7 shows the actions of the difference detector. Mention will be made of the third bit in FIG. 7 (which signifies 9 as a result of A/D conversion). In this example, the register L1 has been updated responsively to the preceding second bit. The determiner 35 has therefore issued a latest updated value select command (L) to the selector 34 (the command signal is high). The selector selects the register L1, which has been updated last, irrelevant of amplitude data in the registers L1 and L2 (See FIG. 7l). Amplitude data to be compared with a result of A/D conversion is therefore a value of 14 contained in the register L1. The result of A/D conversion corresponding to the third bit is a value 9 which is smaller than the value 14. Register update is therefore not executed. At this time, register update (FIG. 7o) is performed in the second difference detector 32. The latest updated value select command (L) for the first difference detector is released (FIG. 7k)(the command signal goes low). Consequently, although the result of A/D conversion corresponding to the third bit; that is, a value 9 is the second largest value at this time, the value is discarded.

Assuming that a positional relationship between a channel clock pulse and a mark is broken due to a jitter, if a position of a peak amplitude of a differential signal corresponding to the second bit in FIG. 7 shifts slightly rightward (towards the third bit), a result of A/D conversion corresponding to the third bit may have a larger value which is larger than a result of A/D conversion corresponding to the ninth bit that should signify a peak amplitude. (As for the ninth bit, since an associated mark is shorter, there is a possibility that the reproduced signal has a smaller amplitude and the differential signal has a smaller peak amplitude.)

Using the difference detector of this embodiment, even when a result of A/D conversion corresponding to the third bit is larger than that corresponding to the ninth bit, if it is smaller than a result of A/D conversion corresponding to the second bit, the third bit is discarded during difference detection. This results in a correct binary code whose second and ninth bits represent 1's.

As mentioned above, according to this embodiment, even if a few jitters occur, record data can be reproduced correctly. Reproducing can be achieved in a stable manner. Moreover, since a relatively large jitter can be tolerated, higher-density recording and reproducing can be realized.

Next, the fourth embodiment of the present invention will be described. The fourth embodiment attempts to simplify the procedure of producing a latest updated value select command signal as well as the circuitry of a difference detector which are adapted for the third embodiment.

In the third embodiment, for a duration after a register containing data corresponding to a bit signifying the largest (smallest) value as a result of A/D conversion is updated until another register containing data corresponding to a bit signifying the smallest (largest) value as a result of A/D conversion is updated, last-updated amplitude data is employed as an object to be compared with a result of A/D conversion but amplitude data having a smaller (larger) value existent in a register is not. In reality, however, it is quite probable that a result of A/D conversion having the second largest value that is not a true peak amplitude of a differential signal (not associated with a mark edge) is signified by a bit adjoining a bit signifying the peak amplitude.

This means that it is not particularly necessary to have a selector selected last-updated amplitude data for a duration after one register is updated until another register is updated. Even if the duration corresponds to one sampling cycle appearing immediately after a register is updated, an appreciable effect is exerted in practice.

Figure 8:
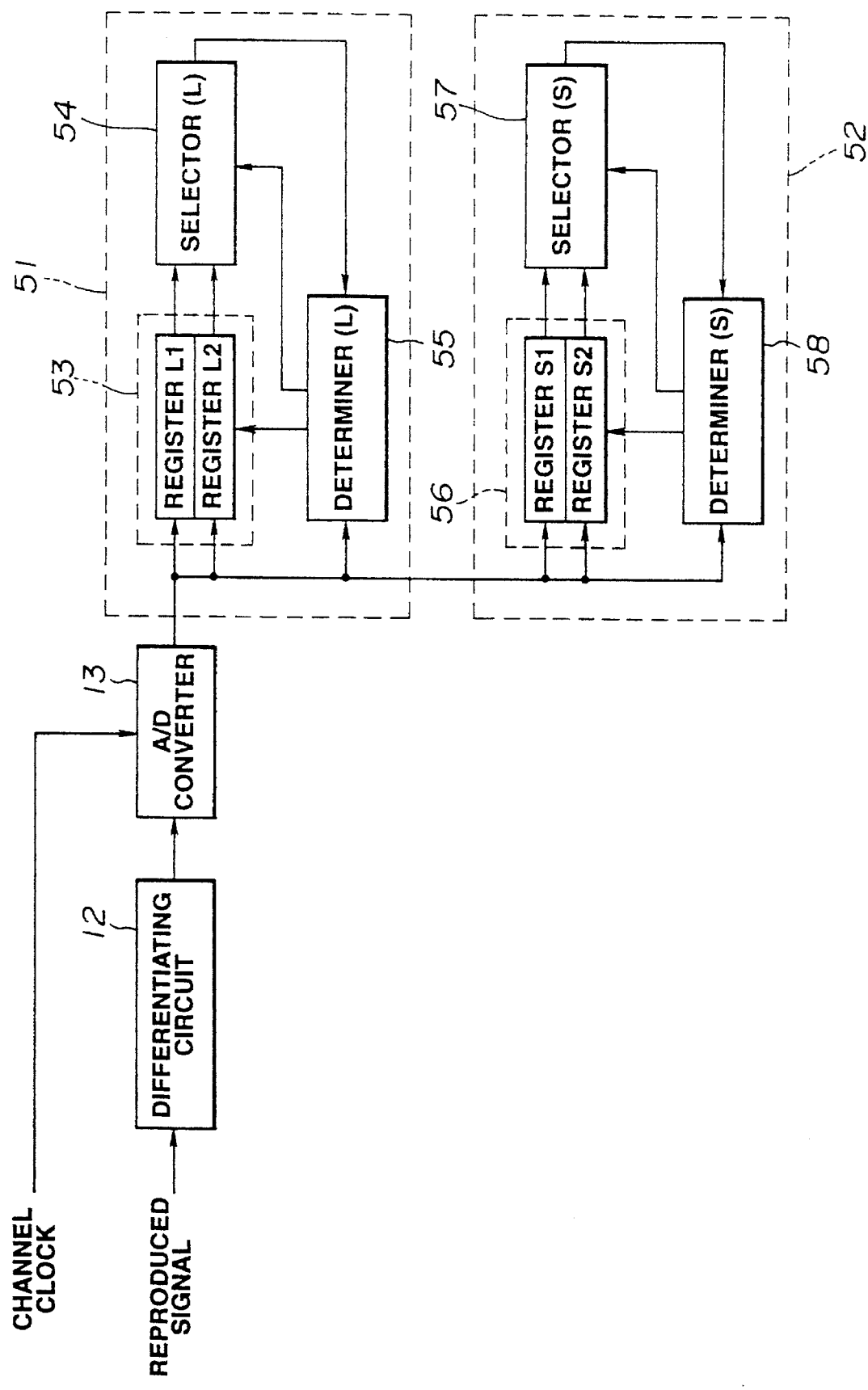
FIGS. 8 and 9 relate to the fourth embodiment of the present invention.
Figure 9:
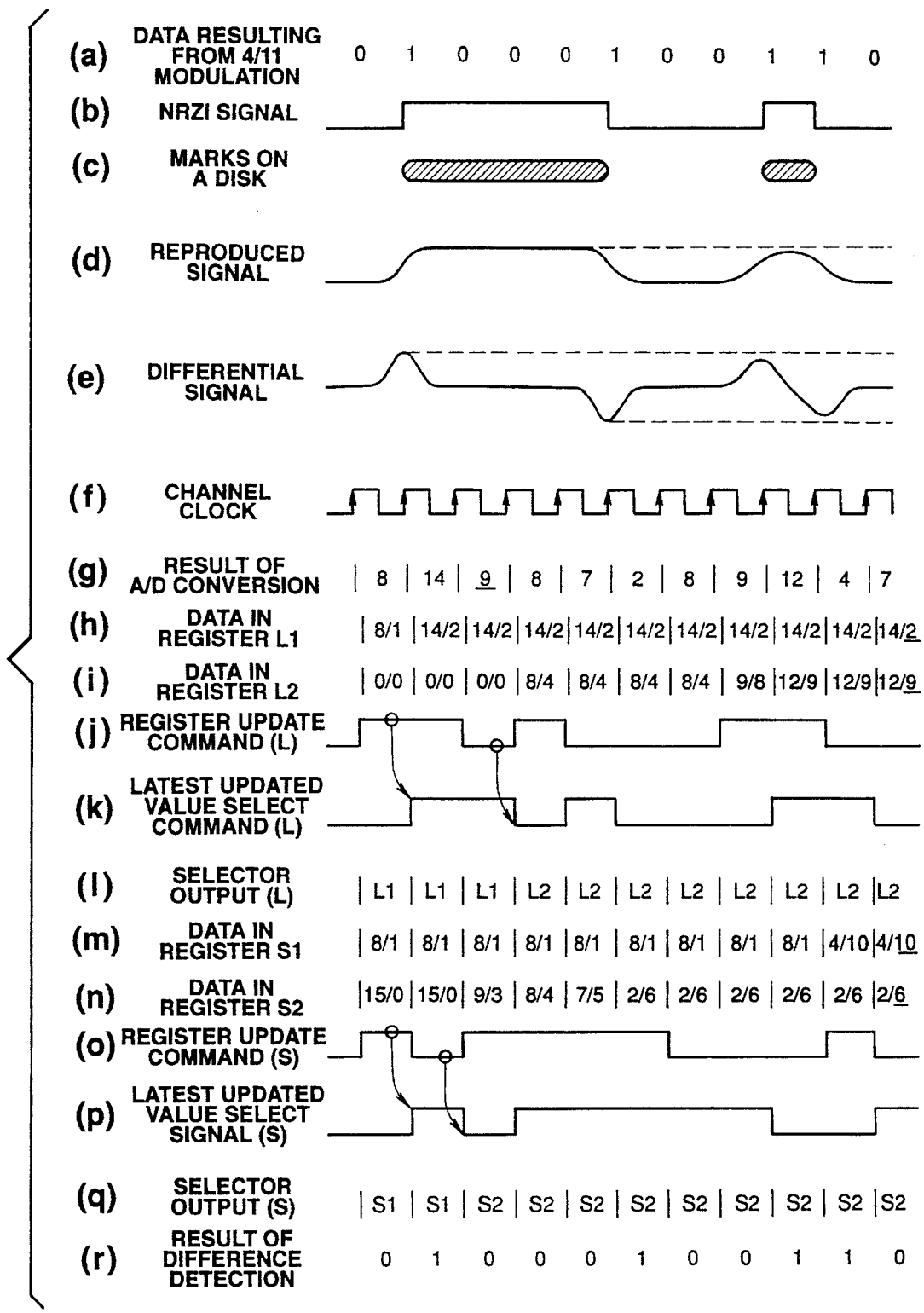

FIG. 8 shows circuit elements of a difference detector designed for the above purpose. FIG. 9 shows waveforms describing actions of the circuit elements. The fourth embodiment is identical to the second or third embodiment except difference detection performed by a signal producer. The waves of the reproduced signal and differential signal and the values provided as results of A/D conversion shown in FIG. 9 are identical to those in the second or third embodiment.

In difference detectors shown in FIG. 8, unlike the difference detectors in the third embodiment shown in FIG. 6, no signal line is linked between the first difference detector 51 and second difference detector 52. The difference detectors operate independently of each other.

The determiners 55 and 58 in the difference detectors in FIG. 8 output a latest updated value select command signal to the selectors 54 and 57 respectively, which is limited to an instant immediately after the contents of a register are updated (FIGS. 9k and 9p).

Table 5 is a truth table describing actions of a determiner (L) 55. A truth table describing actions of the determiner (S) 58 is identical to Table 5 except that the relationships between L registers and S registers are inverse. The actions of the selector are identical to those in the third embodiment. A truth table describing actions taken in determining a register to be updated is identical to Table 2.

TABLE 5

| L register update | Register to be updated | Latest updated value select command | Selected register designation signal |
|---|---|---|---|
| 0 | X | 0 | X |
| 1 | L1 | 1 | L1 |
| 1 | L2 | 1 | L2 |

Consequently, a latest updated value select command signal may be a signal made by delaying a register update command (FIGS. 9j and 9o) by one channel clock pulse. A circuit for producing the latest updated value select command signal may therefore have a simple circuitry. As apparent from comparison between FIGS. 9 and 7, there is few difference in difference detection (switching of registers) between the third and fourth embodiments. It can be said that the difference detector in this embodiment in FIG. 8 has a sufficient capability for correction.

As mentioned above, despite the simple circuitry, this embodiment has the same advantage as the third embodiment. Record data can be reproduced correctly despite a few jitters. Eventually, high-density recording or reproducing can be realized.

Figure 10:
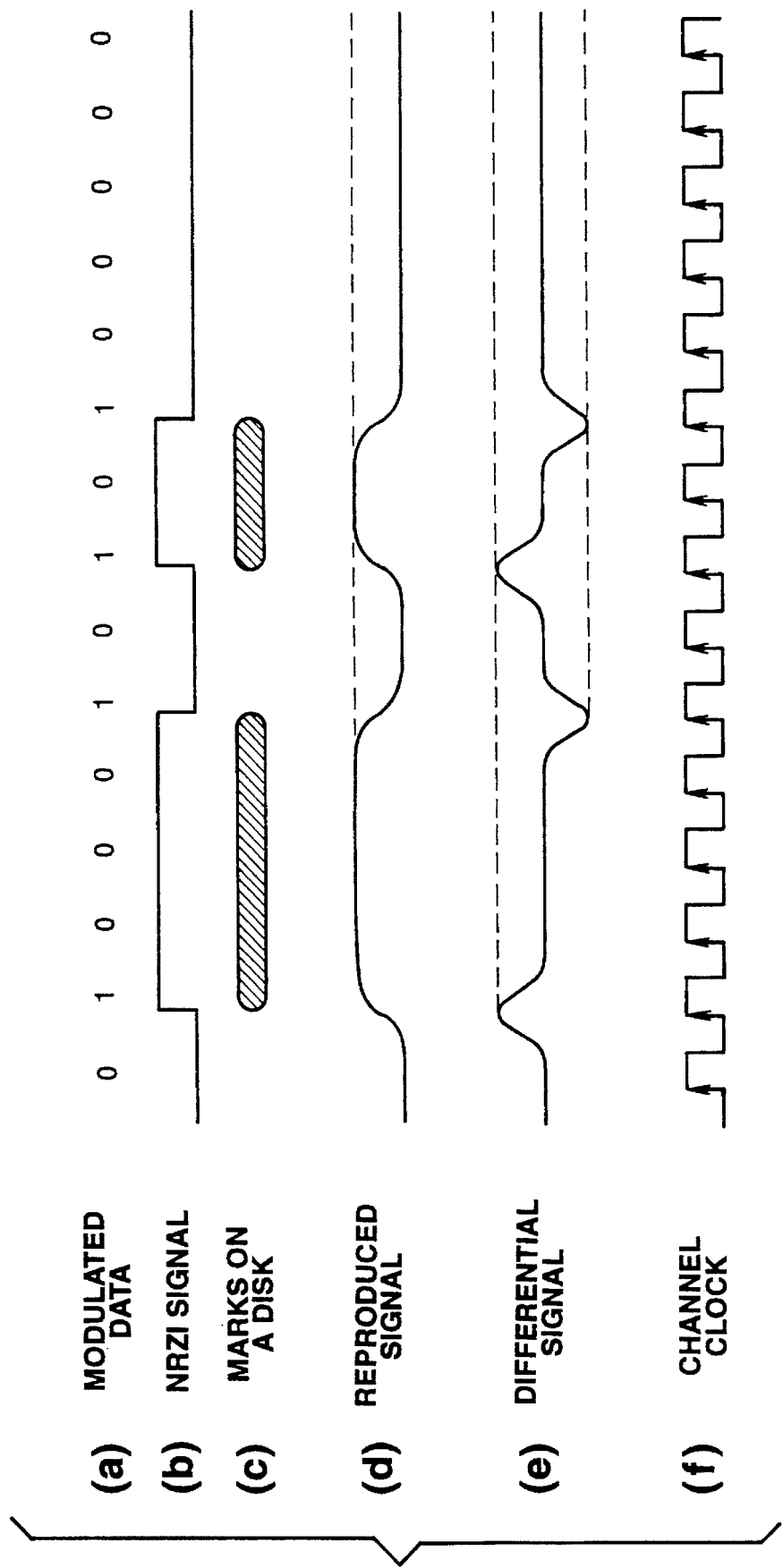
FIGS. 10 and 11 relate to the fifth embodiment of the present invention.

Next, the fifth embodiment of the present invention will be described. The fifth embodiment attempts to further improve recording density by adopting a different modulation method. FIG. 10 is a timing chart describing operation of a signal reproducer in accordance with the fifth embodiment. In the first to fourth embodiments, the 4/11 modulation method is adopted. 4/11 modulation has been developed especially for mark position recording, which therefore is not optimal to mark edge recording. According to the present invention, difference detection is performed on a differential signal of a reproduced signal. From this viewpoint, an optimal modulation method would be the one permitting a differential signal having large amplitudes. For providing a differential signal with large amplitudes, a reproduced signal originating the differential signal should be provided with large amplitudes. The shortest mark length (or mark spacing) should therefore be prolonged in order to avoid degradations in amplitude of a reproduced signal due to the MTF restraints. In mark edge recording, a mark length and a mark spacing are determined with an interval between 1's yielded by modulation. When continuation of 1's is inhibited (a 0 is inserted between 1's), a long mark length and a long mark spacing are attained. (In 4/11 modulation, up to three consecutive 1's are permitted).

When the number of 1's in one byte shall be 4 similarly to that in 4/11 modulation, if both continuation of 1's and continuation of 1's on each byte boundary are inhibited (the final bit is always set to logical 0), more than 15 channel bits are needed to represent 256 combinations of values using one byte. Assuming that one byte is converted into 15 channel bits, 330 combinations of values are available. 256 out of 330 combinations are used. Diverse modulation tables are therefore conceivable. One example is shown as Table 6.

TABLE 6

| | | | | | | | |
|---|---|---|---|---|---|---|---|
| 0 | : 101010100000000 | 10 | : 101001000100000 | 20 | : 101000100000010 |
| 1 | : 101010010000000 | 11 | : 101001000010000 | 21 | : 101000010100000 |
| 2 | : 101010001000000 | 12 | : 101001000001000 | 22 | : 101000010010000 |
| 3 | : 101010000100000 | 13 | : 101001000000100 | 23 | : 101000010001000 |
| 4 | : 101010000010000 | 14 | : 101001000000010 | 24 | : 101000010000100 |
| 5 | : 101010000001000 | 15 | : 101000101000000 | 25 | : 101000010000010 |
| 6 | : 101010000000100 | 16 | : 101000100100000 | 26 | : 101000001010000 |
| 7 | : 101010000000010 | 17 | : 101000100010000 | 27 | : 101000001001000 |
| 8 | : 101001010000000 | 18 | : 101000100001000 | 28 | : 101000001000100 |
| 9 | : 101001001000000 | 19 | : 101000100000100 | 29 | : 101000001000010 |
| 30 | : 101000000101000 | 40 | : 100101000001000 | 50 | : 100100010010000 |
| 31 | : 101000000100100 | 41 | : 100101000000100 | 51 | : 100100010001000 |
| 32 | : 101000000100010 | 42 | : 100101000000010 | 52 | : 100100010000100 |
| 33 | : 101000000010100 | 43 | : 100100101000000 | 53 | : 100100010000010 |
| 34 | : 101000000010010 | 44 | : 100100100100000 | 54 | : 100100001010000 |
| 35 | : 101000000001010 | 45 | : 100100100010000 | 55 | : 100100001001000 |
| 36 | : 100101010000000 | 46 | : 100100100001000 | 56 | : 100100001000100 |
| 37 | : 100101001000000 | 47 | : 100100100000100 | 57 | : 100100001000010 |
| 38 | : 100101000100000 | 48 | : 100100100000010 | 58 | : 100100000101000 |
| 39 | : 100101000010000 | 49 | : 100100010100000 | 59 | : 100100000100100 |
| 60 | : 100100000100010 | 70 | : 100010010100000 | 80 | : 100010000100100 |

TABLE 6-continued

| | | | | | |
|---|---|---|---|---|---|
| 61 : 100100000010100 | 71 : 100010010010000 | 81 : 100010000100010 |
| 62 : 100100000010010 | 72 : 100010010001000 | 82 : 100010000010100 |
| 63 : 100100000001010 | 73 : 100010010000100 | 83 : 100010000010010 |
| 64 : 100010101000000 | 74 : 100010010000010 | 84 : 100010000001010 |
| 65 : 100010100100000 | 75 : 100010001010000 | 85 : 100001010100000 |
| 66 : 100010100010000 | 76 : 100010001001000 | 86 : 100001010010000 |
| 67 : 100010100001000 | 77 : 100010001000100 | 87 : 100001010001000 |
| 68 : 100010100000100 | 78 : 100010001000010 | 88 : 100001010000100 |
| 69 : 100010100000010 | 79 : 100010000101000 | 89 : 100001010000010 |
| | | |
| 90 : 100001001010000 | 100 : 100000101010000 | 110 : 100000010101000 |
| 91 : 100001001001000 | 101 : 100000101001000 | 111 : 100000010100100 |
| 92 : 100001001000100 | 102 : 100000101000100 | 112 : 100000010100010 |
| 93 : 100001001000010 | 103 : 100000101000010 | 113 : 100000010010100 |
| 94 : 100001000101000 | 104 : 100000100101000 | 114 : 100000010010010 |
| 95 : 100001000100100 | 105 : 100000100100100 | 115 : 100000010001010 |
| 96 : 100001000100010 | 106 : 100000100100010 | 116 : 100000001010100 |
| 97 : 100001000010100 | 107 : 100000100010100 | 117 : 100000001010010 |
| 98 : 100001000010010 | 108 : 100000100010010 | 118 : 100000001001010 |
| 99 : 100001000001010 | 109 : 100000100001010 | 119 : 100000000101010 |
| | | |
| 120 : 010101010000000 | 130 : 010100100001000 | 140 : 010100001000100 |
| 121 : 010101001000000 | 131 : 010100100000100 | 141 : 010100001000010 |
| 122 : 010101000100000 | 132 : 010100100000010 | 142 : 010100000101000 |
| 123 : 010101000010000 | 133 : 010100010100000 | 143 : 010100000100100 |
| 124 : 010101000001000 | 134 : 010100010010000 | 144 : 010100000100010 |
| 125 : 010101000000100 | 135 : 010100010001000 | 145 : 010100000010100 |
| 126 : 010101000000010 | 136 : 010100010000100 | 146 : 010100000010010 |
| 127 : 010100101000000 | 137 : 010100010000010 | 147 : 010100000001010 |
| 128 : 010100100100000 | 138 : 010100001010000 | 148 : 010010101000000 |
| 129 : 010100100010000 | 139 : 010100001001000 | 149 : 010010100100000 |
| | | |
| 150 : 010010100010000 | 160 : 010010001001000 | 170 : 010001010100000 |
| 151 : 010010100001000 | 161 : 010010001000100 | 171 : 010001010010000 |
| 152 : 010010100000100 | 162 : 010010001000010 | 172 : 010001010000100 |
| 153 : 010010100000010 | 163 : 010010000101000 | 173 : 010001010000010 |
| 154 : 010010010100000 | 164 : 010010000100100 | 174 : 010001001010000 |
| 155 : 010010010010000 | 165 : 010010000100010 | 175 : 010001001001000 |
| 156 : 010010010001000 | 166 : 010010000010100 | 176 : 010001001000100 |
| 157 : 010010010000100 | 167 : 010010000010010 | 177 : 010001001000010 |
| 158 : 010010010000010 | 168 : 010010000001010 | 178 : 010001000101000 |
| 159 : 010010001010000 | 169 : 010001010100000 | 179 : 010001000100100 |
| | | |
| 180 : 010001000100010 | 190 : 010000100100010 | 200 : 010000001010100 |
| 181 : 010001000010100 | 191 : 010000100010100 | 201 : 010000001010010 |
| 182 : 010001000010010 | 192 : 010000100010010 | 202 : 010000001001010 |
| 183 : 010001000001010 | 193 : 010000100001010 | 203 : 010000000101010 |
| 184 : 010000101010000 | 194 : 010000010101000 | 204 : 001010101000000 |
| 185 : 010000101001000 | 195 : 010000010100100 | 205 : 001010100100000 |
| 186 : 010000101000100 | 196 : 010000010100010 | 206 : 001010100010000 |
| 187 : 010000101000010 | 197 : 010000010010100 | 207 : 001010100001000 |
| 188 : 010000100101000 | 198 : 010000010010010 | 208 : 001010100000100 |
| 189 : 010000100100100 | 199 : 010000010001010 | 209 : 001010100000010 |
| | | |
| 210 : 001010010100000 | 220 : 001010000100100 | 230 : 001001001010000 |
| 211 : 001010010010000 | 221 : 001010000100010 | 231 : 001001001001000 |
| 212 : 001010010001000 | 222 : 001010000010100 | 232 : 001001001000100 |
| 213 : 001010010000100 | 223 : 001010000010010 | 233 : 001001001000010 |
| 214 : 001010010000010 | 224 : 001100000001010 | 234 : 001001000101000 |
| 215 : 001010001010000 | 225 : 001001010100000 | 235 : 001001000100100 |
| 216 : 001010001001000 | 226 : 001001010010000 | 236 : 001001000100010 |
| 217 : 001010001000100 | 227 : 001001010001000 | 237 : 001001000010100 |
| 218 : 001010001000010 | 228 : 001001010000100 | 238 : 001001000010010 |
| 219 : 001010000101000 | 229 : 001001010000010 | 239 : 001001000001010 |
| | | |
| 240 : 001000101010000 | 250 : 001000010101000 | |
| 241 : 001000101001000 | 251 : 001000010100100 | |
| 242 : 001000101000100 | 252 : 001000010100010 | |
| 243 : 001000101000010 | 253 : 001000100010100 | |
| 244 : 001000100101000 | 254 : 001000010010010 | |
| 245 : 001000100100100 | 255 : 001000010001010 | |
| 246 : 001000100100010 | | |
| 247 : 001000100010100 | | |
| 248 : 001000100010010 | | |
| 249 : 001000100001010 | | |

FIG. 10 shows examples of waves of a reproduced signal, a differential signal, and others produced in the foregoing modulation mode. The shortest mark length and mark spacing are as long as those shown in FIG. 10c. A reproduced signal has therefore as large amplitudes as that produced responsively with marks each having a sufficiently long mark length and mark spacing. This results in a differential signal having large amplitudes. Consequently, data can be reproduced in a more stable manner.

Figure 5:
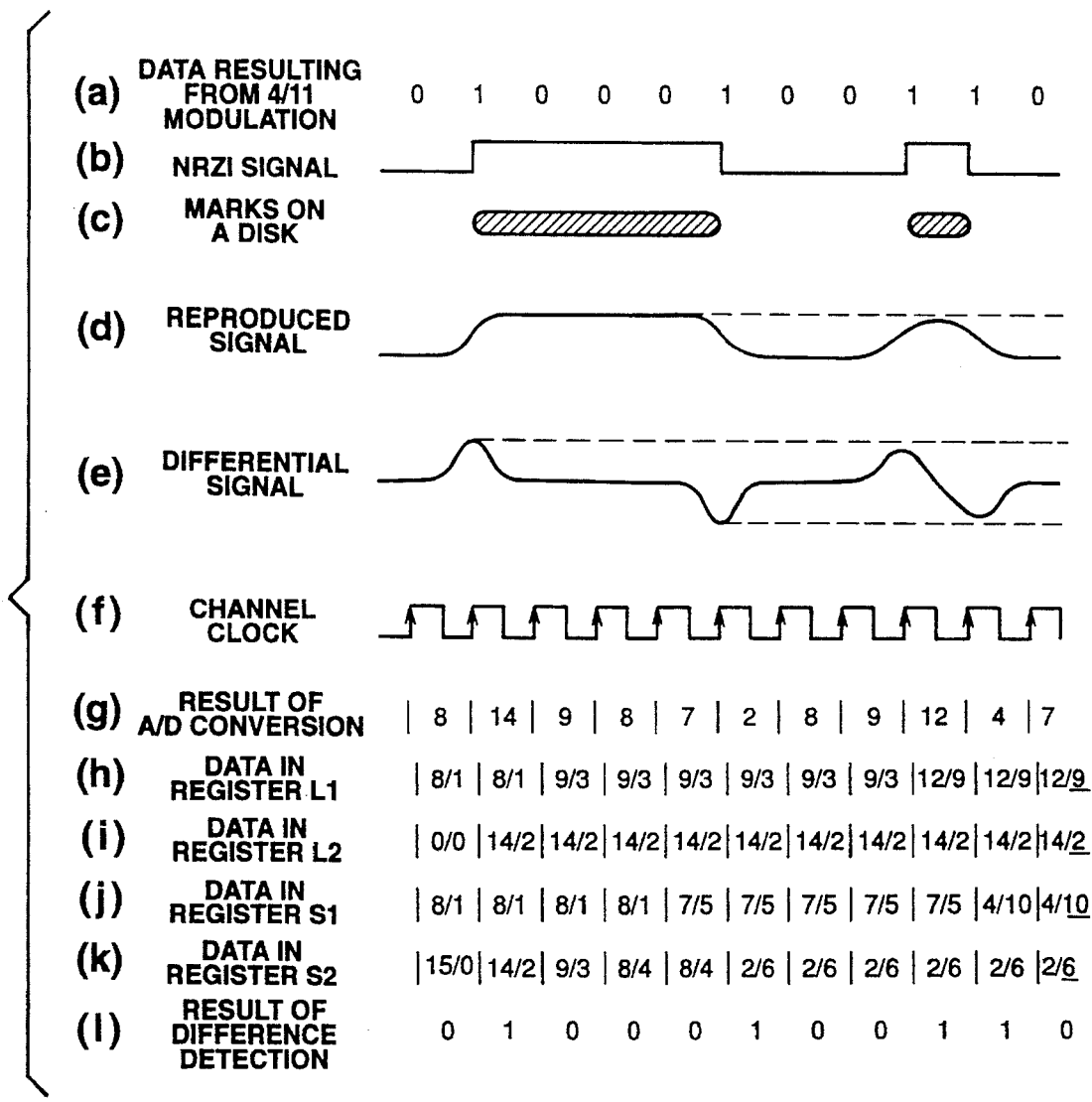

In case data can be reproduced successfully using a differential signal having such amplitudes permitted in any of the first to fourth embodiments, the shortest mark length and mark spacing (physical length on a disk) shown in FIG. 10 may be diminished to those in FIG. 5 (length equivalent to one channel clock pulse in FIG. 5). A data space (channel bit space) can therefore be halved. In the modulation mode of this embodiment, one byte is converted into 15 channel bits. The number of channel bits is 1.4 (=15 divided by 11) times larger than that in the 4/11 modulation mode. Modulation efficiency therefore deteriorates. However, since the shortest mark length and mark spacing get larger, the channel bit space can be halved. As a result, recording or reproducing can be achieved at 1.5 times (=11/15×2) higher density than that provided by conventional 4/11 modulation.

As mentioned above, since this embodiment adopts a modulation method inhibiting continuation of 1's yielded by modulation, a reproduced signal and a differential signal have relatively large amplitudes. Consequently, high-density recording or reproducing can be realized.

Figure 11:
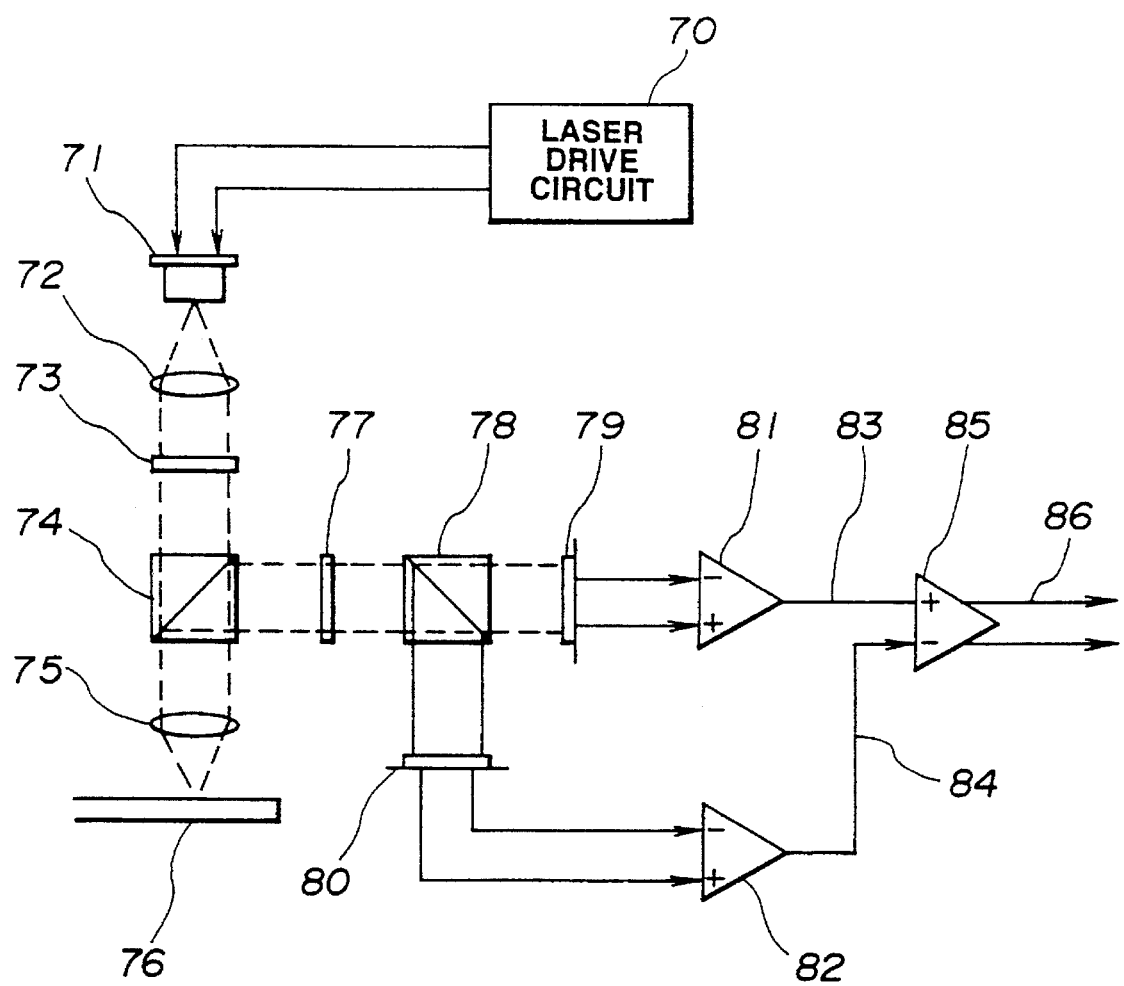

In the aforesaid embodiments, an electric circuit is used to differentiate a reproduced signal and a resultant signal is fed to an A/D converter. As long as a signal having a peak amplitude responsively to an edge of a mark offering information can be produced, optical detection can be adopted as a technique for the production. For example, as shown in FIG. 11, a light beam emanating from a semiconductor laser 71 that is driven by a laser drive circuit 70 may be converged on a recording medium 76, which has undergone magneto-optical recording, by an objective lens 75 via a collimation lens 72, a polarizer 73, and a half mirror 74. The return light is isolated by the half mirror 74, and separated into S-polarized light and P-polarized light by a polarized beam splitter 78 via a quarter wave plate 77. The S-polarized light and P-polarized light are detected by photodetectors 79 and 80 each divided into two portions. Outputs of photoelectric transformers, which correspond to two portions of the photodetector 79 or 80, are subtracted mutually by a differential amplifier 81 or 82. This results in strength difference signals 83 and 84. The strength difference signals 83 and 84 are subtracted mutually by a subtracter 85, thus producing a reproduced signal 86 having a peak amplitude responsively to a mark edge. Using an optical disk unit with a photodetector system composed of the foregoing components, a signal equivalent to the one produced through differentiation by an electric circuit is made available.

Next, the sixth embodiment will be described. In the sixth embodiment, when difference detection is performed independently between leading and trailing edges similarly to that in the second to fifth embodiments, sampling clocks are optimized independently of one another. Even in the sixth embodiment, similarly to the first embodiment, the 4/11 modulation technique for use in combination with the DBF technique is adopted, and thus magneto-optical recording is carried out.

Figure 13:
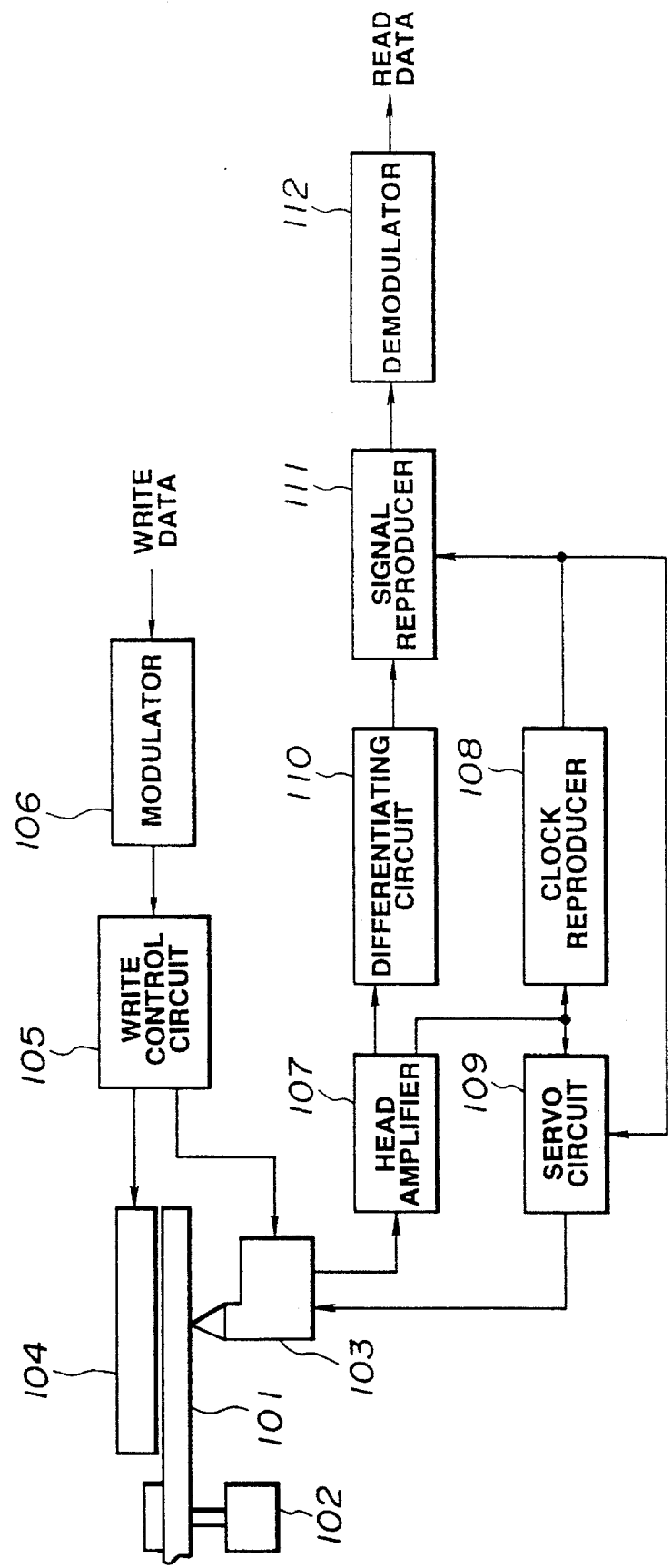

FIG. 13 is a block diagram showing an optical disk unit having a signal reproducer in accordance with the present invention. In FIG. 13, reference numeral 101 denotes an optical disk that is of a sample servo type. Reference numeral 102 denotes a motor that rotates the optical disk 101 at a predetermined rate of revolutions per second. Reference numeral 103 denotes a pickup that irradiates a laser beam to the optical disk 101 and detects light reflected from the optical disk 101. Reference numeral 104 denotes a magnetic head that applies a predetermined magnetic field to the optical disk 101 during data writing or erasing. Reference numeral 105 denotes a write control circuit that controls a laser diode in the magnetic head 104 and the pickup 103, forms a mark on the optical disk 101, and writes data. Reference numeral 106 denotes a modulator that modulates write data sent from a high-order controller in a 4/11 mode, converts the modulated data in an NRZI mode, and outputs a write signal to a write control circuit 105. Reference numeral 107 denotes a head amplifier that photoelectrically transforms and amplifies reflected light which is detected by the pickup 103. Reference numeral 108 denotes a clock reproducer that extracts a pattern comparable to clock pits formed on the optical disk 101 from a reproduced (strength) signal sent from the head amplifier 107, multiplies the pattern using a PLL, and thus reproduces a channel clock. Reference numeral 109 denotes a servo circuit that detects various error signals and controls focusing and/or tracking of the pickup 103 as well as seeking. Reference numeral 110 denotes a differentiating circuit that differentiates a reproduced signal (magneto-optical signal) sent from the head amplifier 107 and outputs a signal which has a maximum or minimum level responsively to an edge of a mark formed on the optical disk 101. Reference numeral 111 denotes a signal reproducer that reproduces record data using a signal sent from the differentiating circuit 110. Reference numeral 112 denotes a demodulator that demodulates reproduced data in the 4/11 mode and outputs read data to the high-order controller.

The techniques for controlling rotation of an optical disk, reproducing a channel clock, recording or erasing data, detecting an error signal, and servo-controlling a pickup are already known. No mention will be made of the techniques.

Figure 12:
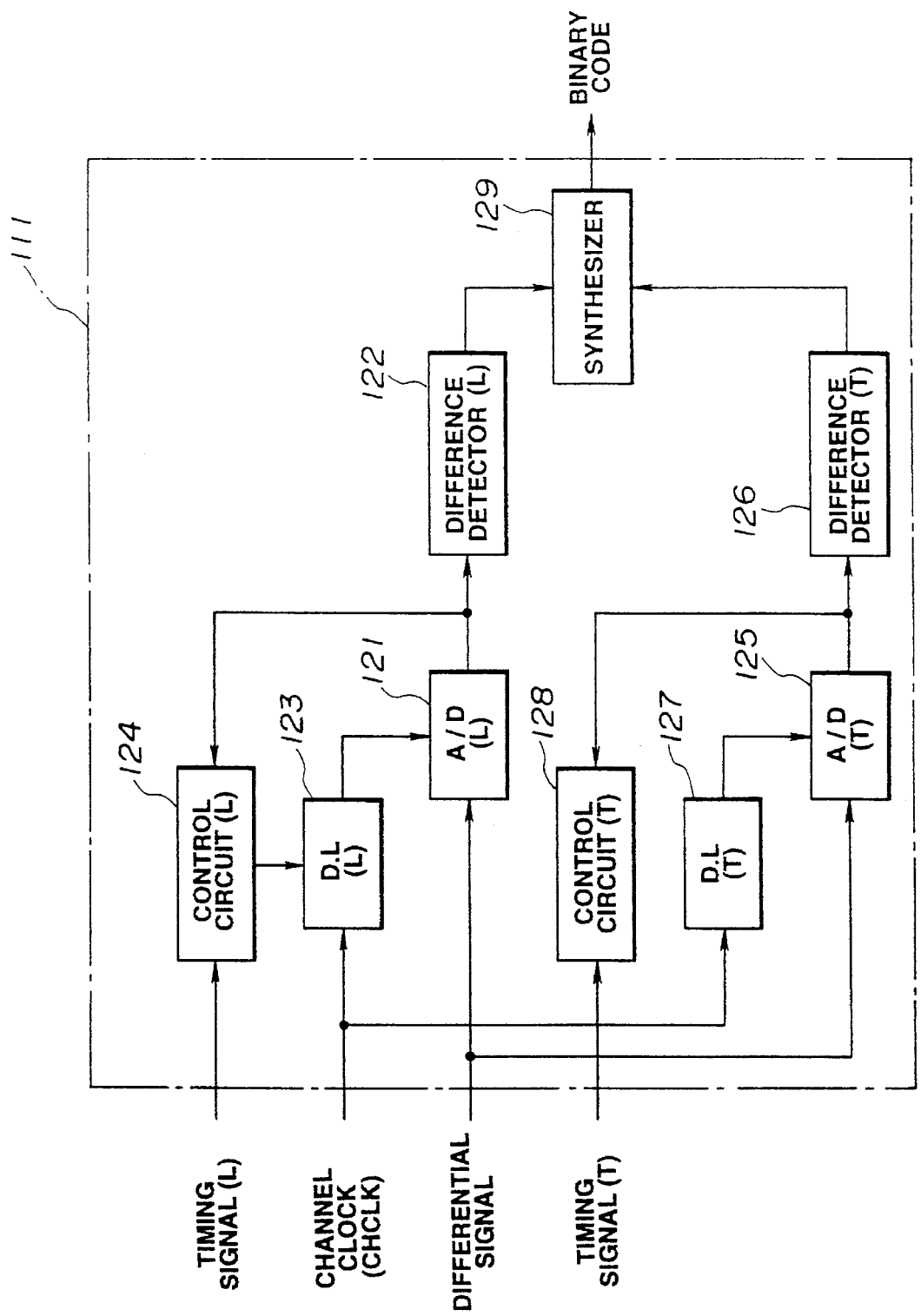
FIGS. 12 to 15 relate to the sixth embodiment of the present invention.

FIG. 12 shows the signal reproducer 111 in more details. In FIG. 12, reference numeral 121 denotes an A/D converter for converting a differential signal of a reproduced signal into a digital form. Reference numeral 122 denotes a difference detector. Reference numeral 123 denotes a programmable delay line. Reference numeral 124 denotes a control circuit for controlling the delay line 123. The A/D converter 121 converts a differential signal into a digital form in units of four bits and thus provides a decimal number ranging from 0 to 15. (The largest positive level is converted into 15, the largest negative level is converted into 0, a zero level is converted into 8.) Reference numerals 125 to 128 denote the same circuit elements as reference numerals 121 to 124. Reference numeral 129 denotes a synthesizer.

In the signal reproducer 111, the difference detector 122 detects a maximum level of a differential signal of a reproduced signal that is associated with a leading edge of a mark on the optical disk 101. The difference detector 126 detects a minimum level of the differential signal that is associated with a trailing edge of a mark. The values provided by the difference detectors are synthesized by the synthesizer 129. Consequently, a binary code is fed to the demodulator 112.

Hereinafter, circuit elements handling leading edges of marks may bear a letter L and circuit elements handling trailing edges may bear a letter T. A particular procedure and circuitry for difference detection are known, of which description will be omitted.

Figure 14:
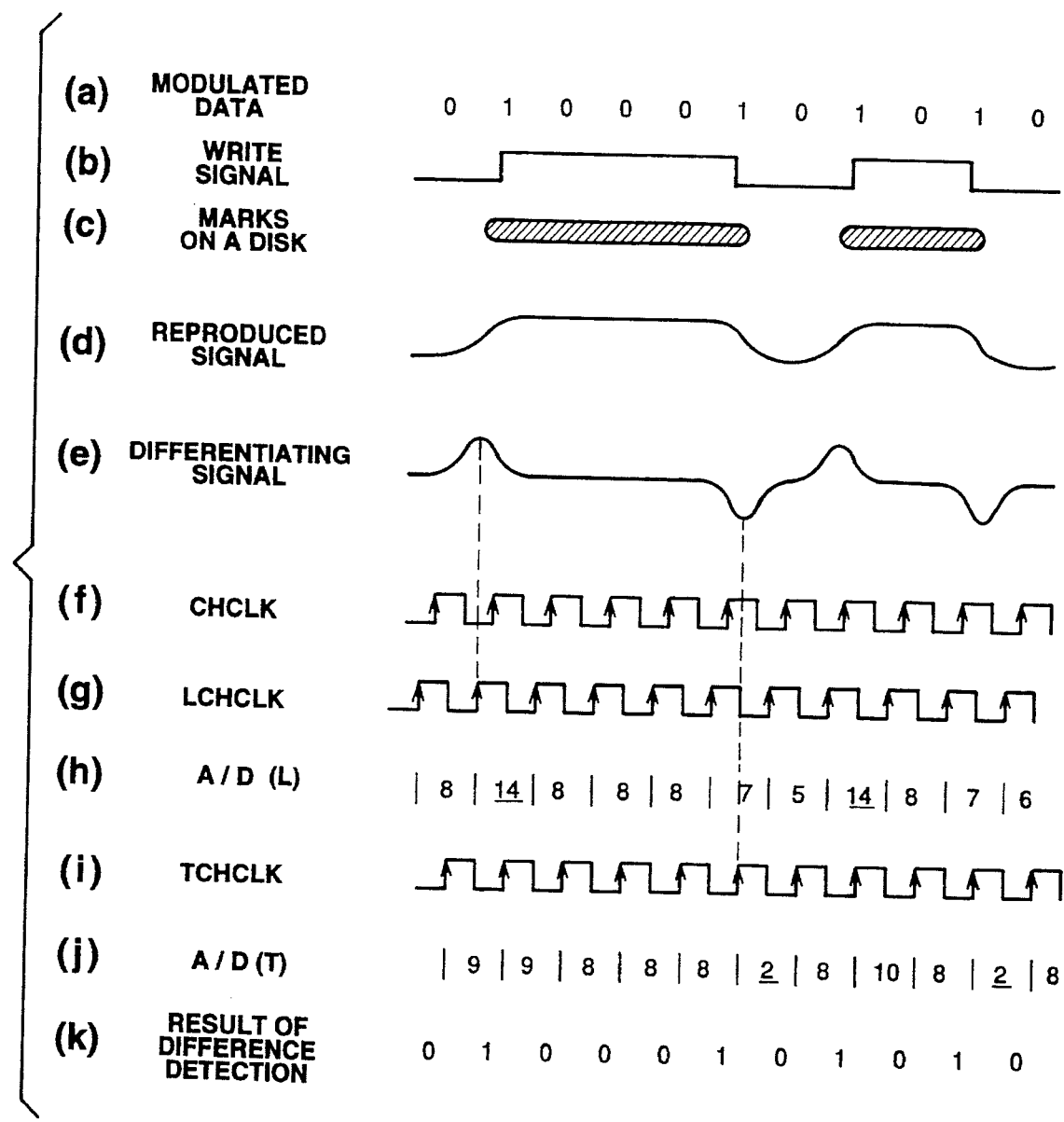

FIG. 14 shows actions of the signal reproducer 111. Assuming that 4/11 modulation performed on certain write data by the modulator 106 results in data shown in FIG. 14a, when mark edge recording is adopted, a write signal to be fed to the optical disk 101 has a wave shown in FIG. 14b. The write control circuit 105 allows the magnetic head 104 to generate a bias magnetic field in a write direction, and causes a laser in the pickup 103 to emit light in response to the signal shown in FIG. 14b.

At this time, when the light emission power of the laser is optimized in terms of the sensitivity of the optical disk 101 and the ambient temperature, an edge of each mark formed coincides with an edge of each write signal pulse. In general, it is hard to achieve this kind of control accurately. Recording is not always performed under optimal conditions. Herein, recording will be discussed under the conditions that a laser has slightly high light emission power and marks that are slightly longer than necessary are formed in response to a write signal as shown in FIG. 14c.

During reproducing, a laser beam is irradiated to the optical disk 101 with the power that is weaker than that during writing. Thus, marks shown in FIG. 14c are detected optically. The result of detection is photoelectrically transformed, whereby a reproduced signal is produced. Since the diameter of a spot of a laser beam used for reading is not infinitesimal, a resultant reproduced signal has a wave rounded responsively to edges of marks as shown in FIG. 14d.

A reproduced signal is differentiated by the differentiating circuit 110, thus yielding a differential signal shown in FIG. 14e. In a conventional recording procedure, difference detection is performed on the differential signal synchronously with a channel clock CHCLK shown in FIG. 14f, and thus binary coding is achieved. In this embodiment, clocks LCHCLK (FIGS. 14g) and TCHCLK (FIG. 14i), which have the same frequency as the clock CHCLK but are out of phase with (lagging) the clock CHCLK, are employed for difference detection. The clock LCHCLK is a clock that is phased with a maximum level of the differential signal in FIG. 14e associated with a leading edge of a mark, while the clock TCHCLK is a clock that is phased with a minimum level of the differential signal associated with a trailing edge of a mark (clock phasing will be described later). The A/D converter (L) 121 samples the differential signal synchronously with the clock LCHCLK. Assuming that the samples have values shown in FIG. 14h, the difference detector (L) 122 performs difference detection so as to detect two maximum levels. This results in a binary code whose second and eight bits represent 1's. Similarly, the A/D converter (T) 125 samples the differential signal synchronously with the clock TCHCLK. The difference detector (T) 126 then performs difference detection so as to detect two minimum levels. The binary codes provided by the difference detectors are synthesized mutually by the synthesizer 129. A finalized binary code (FIG. 14k) is then fed to the demodulator 112.

Figure 15:
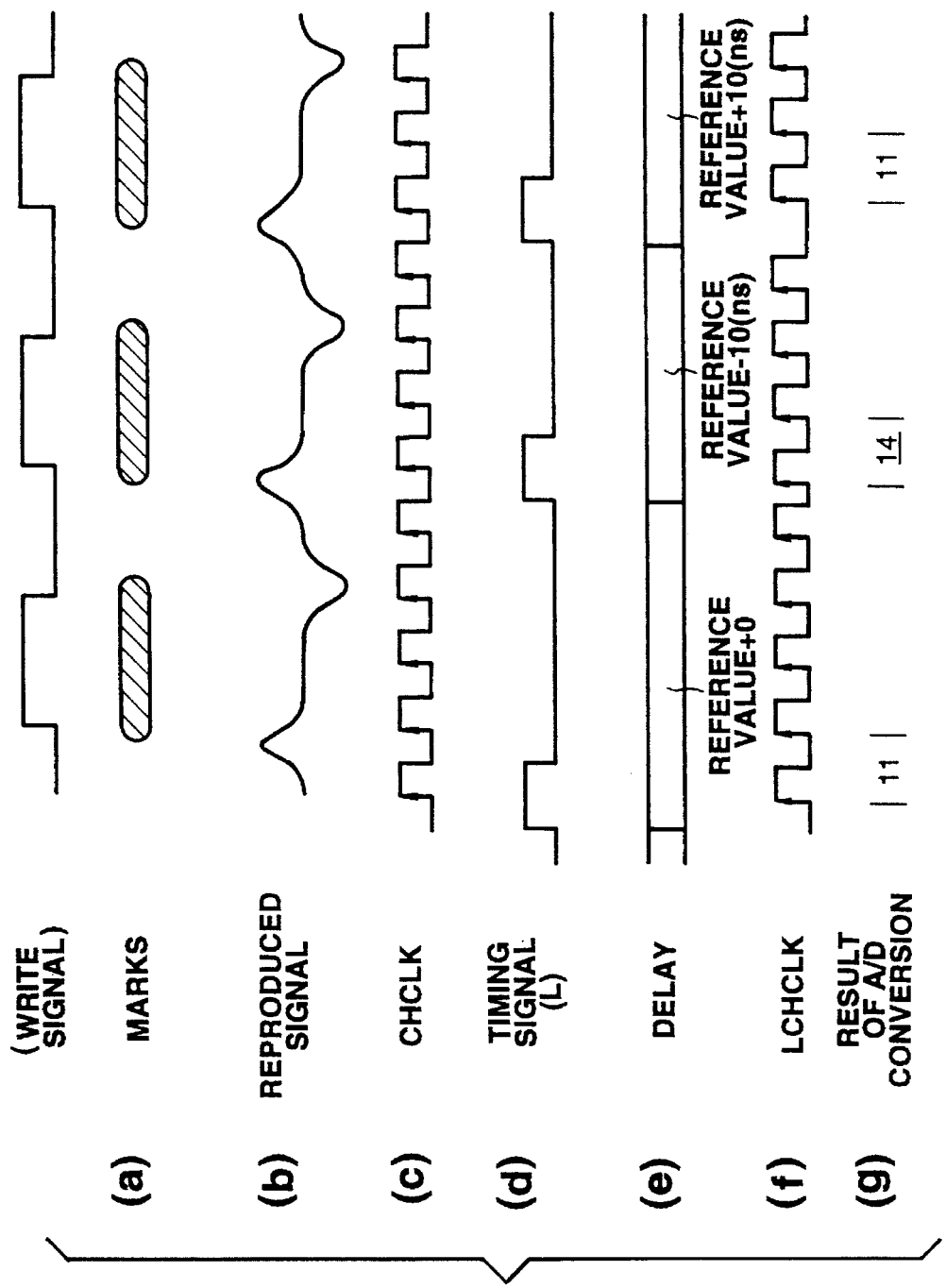

Next, how to phase the clock signals LCHCLK and TCHCLK (how to determine a delay) will be described. FIG. 15 shows phasing of the clock LCHCLK.

For data recording, a specific pattern (for example, 101010..., etc. which is not necessarily conformable to the rules of 4/11 modulation) is always written at the start of a sector or the like that is a unit of recording or reproducing. The specific pattern is to be recorded under the same recording conditions as data to be written subsequently. Depending on in what fashion the specific pattern is written, it can be recognized how an edge of subsequent data has shifted.

During reproducing, the phases of the clock signals LCHCLK and TCHCLK are controlled so that the samples of a differential signal associated with the specific pattern will have large absolute values. For example, when the clock LCKCLK is concerned, while the delay time in the delay line (L) 123 is changed in value consecutively, the A/D converter (L) 121 samples the differential signal synchronously with the clock LCHCLK. A delay time providing a maximum value as a sample is set as the delay time in the delay line (L) 123 for the sector. Similarly, the delay in the delay line (T) 127 is set so that a sample of the differential signal provided by the A/D converter (T) 125 has a minimum value.

In FIG. 15, similarly to FIG. 14, longer marks are formed under the condition that the power of a laser is set to a value higher than an optimal value. In this case, a leading edge of each mark is shifted a bit ahead of a leading edge formed according to original timing (or responsively to a leading edge of the clock CHCLK). When the delay in the delay line (L) 123 is set to a value smaller than a reference value (a delay causing both the clocks LCHCLK and CHCLK to overlap each other), a result of A/D conversion has a maximum value (underlined value in FIG. 15g). The delay value is adopted as the delay of the clock LCHCLK relative to the clock CHCLK for use in reading subsequent data. The delay of the clock TCHCLK, which is phased in relation to a trailing edge of each mark, relative to the clock CHCLK is determined in a similar manner, wherein a value a bit larger than the reference value is adopted as the delay.

In contrast with FIG. 15, when the power of a laser is set to a value lower than an optimal value, shorter marks are formed. A leading edge of each mark is shifted behind, while a trailing edge thereof is shifted ahead. The delay of the clock LCHCLK is set to a larger value, while the delay of the clock TCHCLK is set to a smaller value.

The aforesaid procedure makes it possible to detect steady-state shifts of leading and trailing edges using a specific pattern field. Clock signals that are corrected for the shifts are used for A/D conversion. Difference detection is performed independently between edges. The results of difference detection are synthesized, thus providing a finalized binary code.

Since a variation in mark length can be sensed by checking a specific pattern, when verification is performed to achieve reproducing immediately after data recording, if a mark length is found longer than a correct one (a leading edge has shifted ahead and a trailing edge has shifted behind), the power of a laser is regarded too high and will be reduced for the next recording. This kind of control may be attained.

As described above, according to this embodiment, clocks, which are phased with a peak amplitude of a differential signal of a reproduced signal responsively to leading and trailing edges of each mark, are used to perform difference detection independently between the leading and trailing edges. Even if the recording conditions are not optimized and marks formed vary in length, difference detection can be achieved according to optimal timing. Consequently, data can be reproduced more correctly. In other words, even if a mark length varies, as long as a variation in position of a leading or trailing edge is limited, binary coding can be achieved without a detection error by performing difference detection. This results in improved reliability of data reproducing. Furthermore, since a margin gets larger, data can be recorded at high density. Moreover, since a variation in mark length can be corrected during reproducing, strict correction need not be performed during recording. This results in a simplified recording unit.

In this embodiment, two different A/D converters are employed in relation to leading and trailing edges respectively. An A/D converter offering higher processing speed may be used to sample a differential signal responsively to leading and trailing edges of each mark. In this case, a result of A/D conversion associated with a leading edge and a result of A/D conversion associated with a trailing edge may be stored in registers of different systems so that difference detection is performed independently between leading and trailing edges. Alternatively, which of values associated with leading and trailing edges be selected may be determined according to a result of A/D conversion (for example, if a result of A/D conversion has a positive value, a value associated with a trailing edge is adopted.), and then binary coding may be achieved using a single difference detector. As for the procedure of difference detection, the procedure accompanied by correction, which has been described in conjunction with the first to fifth embodiments, may be adopted aside from the conventional one.

In this embodiment, an electric circuit is used to differentiate a reproduced signal, and thus a signal that has a peak level responsively to a mark edge is produced and fed to an A/D converter. Alternatively, a mark edge may be detected using an optical technique prior to photoelectric transformation. Processing similar to differentiation is then performed, and the result of processing is photoelectrically transformed and then converted into a digital form. This optical mark edge detection has been disclosed in, for example, Japanese Patent Laid-Open No. 63-313335/1988. In optical mark edge detection, unlike differentiation by an electric circuit, a noise is not amplified. From this viewpoint, the optical edge detection would be preferred.

Aside from a procedure in which difference detection is performed on a signal having undergone edge detection, the present invention can apply to a procedure in which difference detection is performed on a reproduced signal having not undergone differentiation in order to select amplitudes close to a mean amplitude or an average amplitude, and thus edge positions are detected (for example, a procedure disclosed in Japanese Patent Laid-Open No. H5-101396/1993). In this case, clocks are phased with results of A/D conversion that are most close to a mean amplitude or an average amplitude.

The present invention can apply to any recording technique (for example, phase change recording) other than the magneto-optical recording technique without any change. Furthermore, the present invention can apply to any modulation technique other than the 4/11 modulation technique as long as modulation ensures a certain number of 1's in a block giving a delimiter for modulation. Moreover, the present invention can apply to any optical disk that is not formatted in the sample servo mode but in a typical continuous servo mode, as long as marks serving as references are formed and a channel clock is reproduced using the marks as references.

Next, the seventh embodiment will be described.

A procedure for controlling a sampling clock during mark position recording will be described in conjunction with the seventh embodiment of a signal reproducing apparatus in accordance with the present invention. The 4/11 modulation technique for use in combination with the DBF technique will be adopted.

Figure 16:
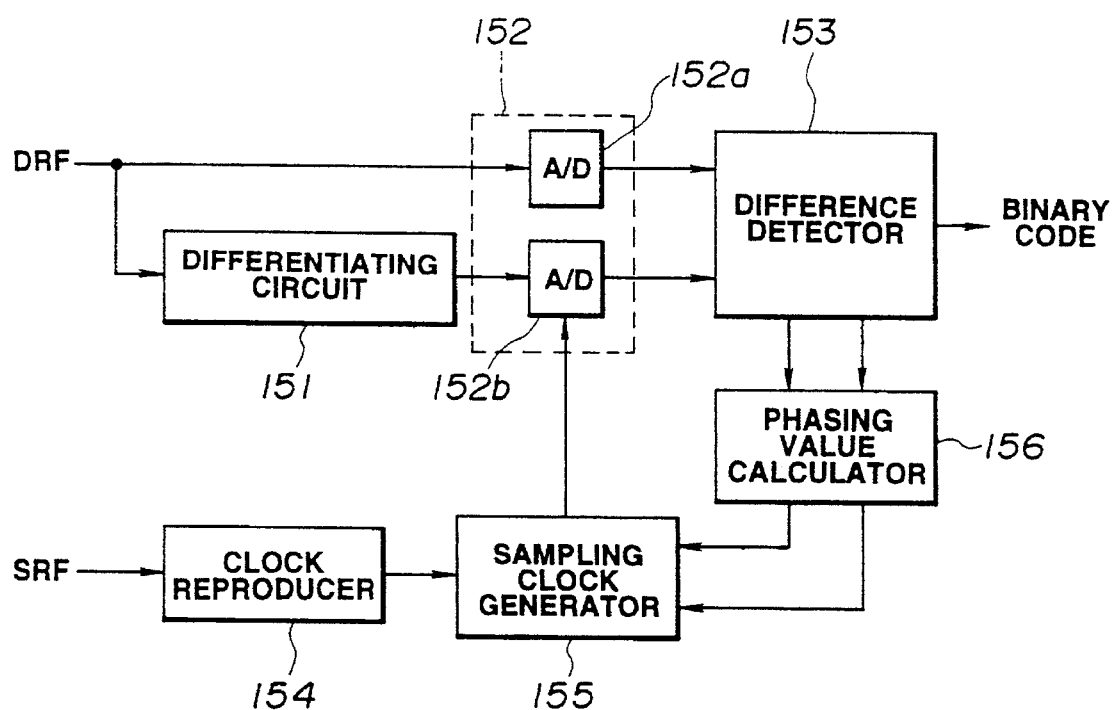
FIGS. 16 to 18 relate to the seventh embodiment of the present invention.

The signal reproducing apparatus of the seventh embodiment comprises, as shown in FIG. 16, a differentiating circuit 151 for differentiating a magneto-optical reproduced signal DRF that is reproduced by an optical pickup which is not shown, an A/D converter 152 composed of A/D converters 152a and 152b for sampling the magneto-optical reproduced signal DRF and an output of the differentiating circuit 151, a difference detector 153 for detecting bits that should represent 1's by analyzing the samples provided by the A/D converter 152, a clock reproducer 154 for reproducing a channel clock using a reflected light intensity signal SRF detected by an optical pickup that is not shown, a sampling clock generator 155 that uses a channel clock reproduced by the clock reproducer 154 to generate a sampling clock used by the A/D converter, and a phasing value calculator 156 that calculates a magnitude of phasing a sampling clock using samples of a differential signal provided by the A/D converter 152b and signified by bits that are set to logical 1 as a result of difference detection by the difference detector 153.

Figure 17:
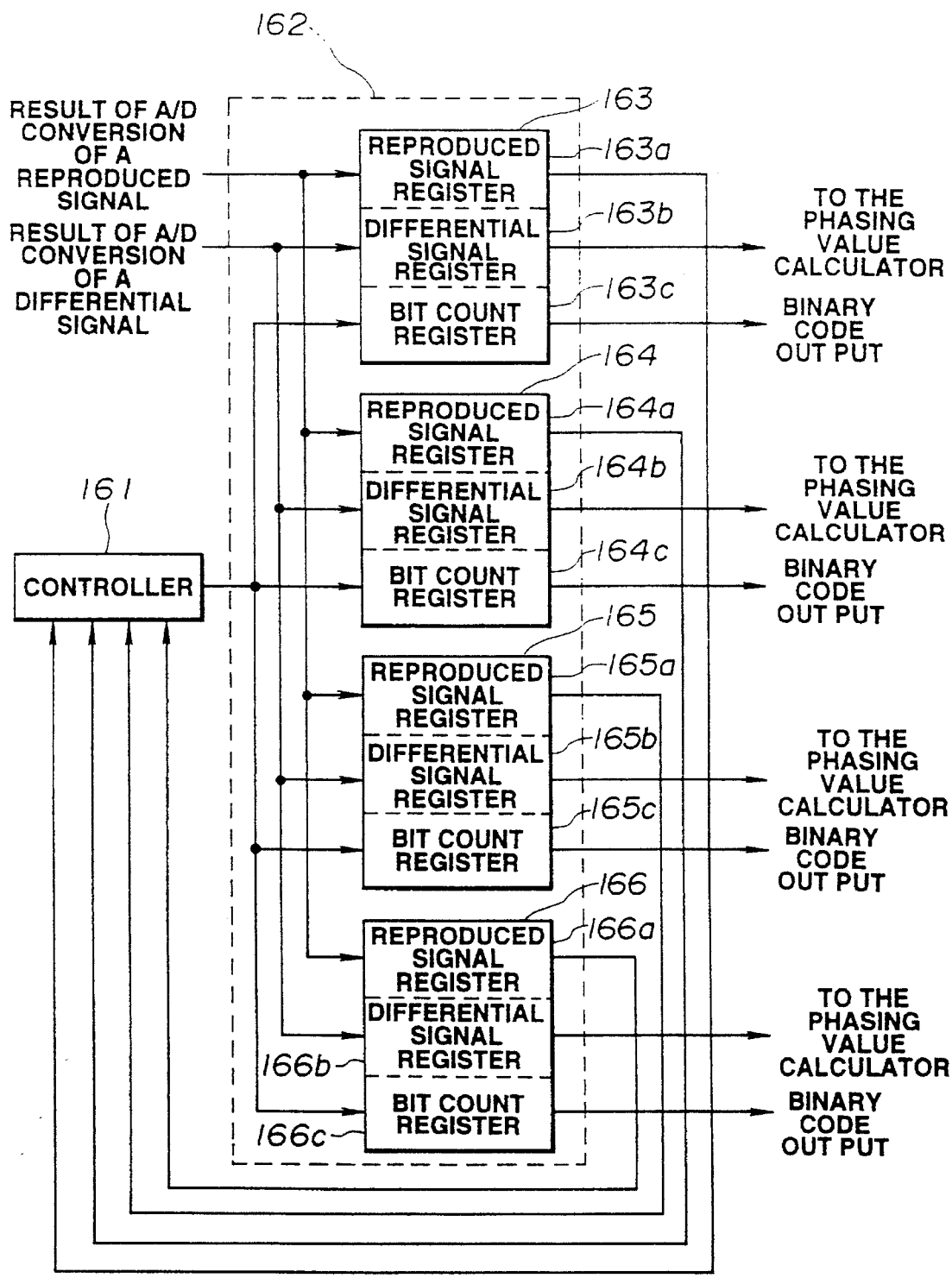

The difference detector 153 comprises, as shown in FIG. 17, a controller 161 for controlling an operation of difference detection and a group of registers 162 for storing results of A/D conversion performed on a reproduced signal by the A/D converter 162. The group of registers 162 is composed of four sets of registers 163 to 166. The sets of registers 163 to 166 include reproduced signal registers 163a to 166a for storing results of A/D conversion performed on a reproduced signal DRF, differential signal registers 163b to 166b for storing results of A/D conversion performed on a differential signal of the signal DRF, and bit count registers 163c to 166c each of which stores a bit position in a block serving as a unit of modulation that signifies each result of A/D conversion.

For difference detection, the difference detector 163 operates as described below.

The controller 161 initializes the contents of the sets of registers 163 to 166 at the start of each block (assigns minimum values to the reproduced signal registers 163c to 166a). Every time a reproduced signal and a differential signal are converted into digital forms synchronously with a sampling clock, the controller 161 searches for a register holding a minimum value among the reproduced signal registers 163a to 166a, and compares the value with a latest result of A/D conversion performed on a reproduced signal. Only when the result of A/D conversion has a larger value, the contents of the set of registers including the register holding the minimum value are updated with latest results of A/D conversion performed on the reproduced and differential signals and with a bit count. When this operation is repeated within a block, values corresponding to four bits that signify large values as results of A/D conversion performed on the reproduced signal are left in the registers at the end of the block.

Next, the operation of the signal reproducing apparatus of this embodiment will be described.

First, based on a reflected light intensity signal SRF, the clock reproducer 154 reproduces a channel clock using clock pits on a disk as references (this procedure is already known and therefore will not be described). The sampling clock generator 155 shifts the phase of the channel clock in response to an instruction sent from the phasing value calculator 156, and produces a sampling clock (the actions of the phasing value calculator 156 will be described later).

The A/D converters 152a and 152b sample a reproduced signal DRF and its differential signal synchronously with the sampling clock, and route the results of A/D conversion to the difference detector 153. The difference detector 153 selects four bits signifying the samples of the reproduced signal DRF that have large values (in position recording, the reproduced signal itself is subjected to difference detection), and then outputs a binary code. At the same time, the results of A/D conversion performed on the differential signal, which correspond to the selected four bits, are sent to the phasing value calculator 156. A magnitude of phasing is thus calculated. The sampling clock generator 155 shifts the phase of the sampling clock by the magnitude of phasing (the phase can be controlled by, for example, modifying the delay in a programmable delay line).

The clock phase control is executed every time difference detection is completed; that is, every time a block or a unit of modulation comes to an end (in units of one byte when 4/11 modulation is adopted).

Figure 18:
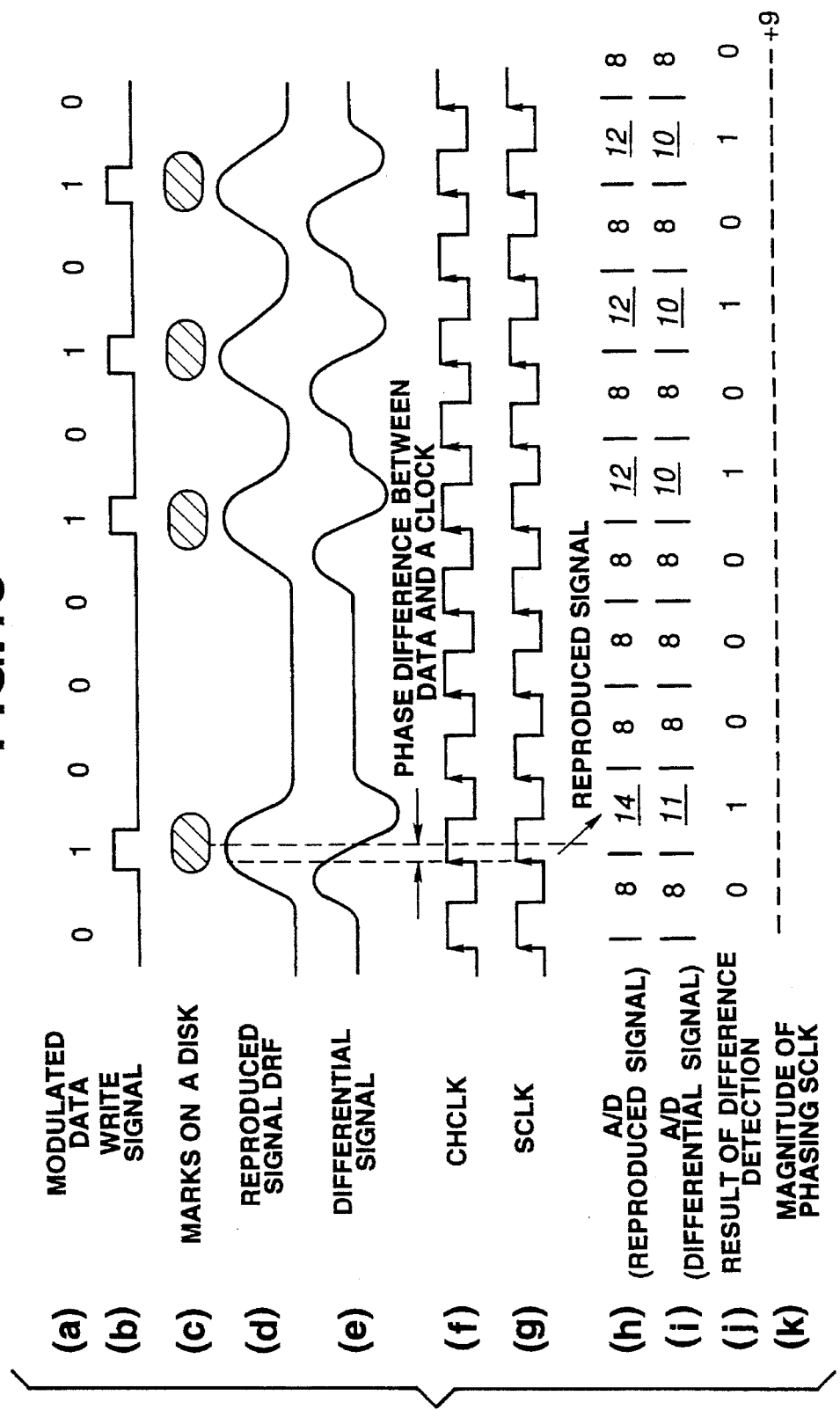

Next, the detailed actions of the signal reproducing apparatus of this embodiment will be described in conjunction with FIG. 18.

Discussed will be actions taken when data modulated in a 4/11 mode, which is shown in FIG. 18*a*, are written and then recorded on a disk by mark position recording in response to write pulses (write signal) shown in FIG. 18*b*, and, as a result, marks are formed responsively to data representing 1's as shown in FIG. 18*c*.

Reproducing from a disk on which marks are formed as mentioned above results in a magneto-optical reproduced signal DRF shown in FIG. 18*d*. The differentiating circuit 151 differentiates the signal DRF and provides a differential signal shown in FIG. 18*e*.

On the other hand, a channel clock CHCLK is reproduced as shown in FIG. 18*f* using clock pits formed on a disk as references. The channel clock is reproduced using clock pits as references. Herein, marks slightly change their positions because of the influence of an environment for writing. A center of a mark does not therefore always coincide with a leading edge of a channel clock, thus causing a phase shift.

As described previously, the sampling clock SCLK used by the A/D converter 152 is controlled in phase by the sampling clock generator. Herein, it is assumed that the sampling clock is in phase with the channel clock in its initial state (FIG. 18*g*).

Synchronously with the signal SCLK, the A/D converter 152 samples the reproduced signal DRF and its differential signal and converts them into digital forms. The A/D conversion shall result in the values shown in FIGS. 18*h* and 18*i*. Note that the A/D conversion is performed in units of four bits and that a value 8 is associated with a zero level of a signal, a value 15 is associated with a maximum level thereof, and a value 0 is associated with a minimum level thereof. The difference detector 153 performs difference detection on the results of A/D conversion as described previously. Finally, bits signifying underlined values provided as results of A/D conversion are set to logical 1. The resultant binary code is sent to a decoder, which is not shown, in a succeeding stage, and then demodulated in a 4/11 mode (FIG. 18*j*). On the other hand, the results of A/D conversion performed on the differential signal, which correspond to the bits representing 1's, are sent to the phasing value calculator 156.

The phasing value calculator 156 calculates a magnitude of phasing the sampling clock using the sent results of A/D conversion performed on the differential signal. When the sampling clock is in phase with data (center of a mark), a result of A/D conversion performed on the differential signal has a value 8 associated with the zero level. If the sampling clock leads, as apparent from FIG. 18*e*, the result of A/D conversion has a value larger than that associated with the zero level. In contrast, when the sampling clock lags, the result of A/D conversion has a value smaller than that associated with the zero level. Thus, a difference of a sent result of A/D conversion performed on a differential signal (in the above example, a value 11, 10, 10, or 10) from a value 8 associated with a zero level is indicative of a phase difference of a current sampling clock from optimal sampling timing. The differences from the value 8 total to +9. The value +9 is sent as a magnitude of phasing (a magnitude of phasing the clock SCLK) to the sampling clock generator 155 (FIG. 18*k*).

The sampling clock generator 155 shifts the phase of the sampling clock according to the magnitude of phasing sent from the phasing value calculator 156. In this example, the value +9 has been sent. The sampling clock is therefore lagged by a time interval proportional to the value +9; that is, 9 ns (the delay of the sampling clock from the channel clock is increased).

The phase control of the sampling clock is performed for each block serving as a unit of modulation or demodulation, whereby the phase of the sampling clock can always coincide with the position of data on a disk.

As mentioned above, according to the signal reproducing apparatus of this embodiment, when data is recorded or reproduced on or from a disk formatted in a sample servo mode according to a mark position recording procedure, the phase of a sampling clock for use in difference detection is controlled in relation to a differential signal of a reproduced signal to be subjected to difference detection. Fine phase control can therefore be achieved without embedding a specific pattern for phasing to the start of each sector. Consequently, high-density recording or reproducing can be achieved without causing a user-specific field to shrink. Eventually, a recording capacity-per-disk can be increased.

Next, the eighth embodiment of the present invention will be described.

A procedure for controlling a sampling clock during mark edge recording will be described in conjunction with the eighth embodiment of a signal reproducing apparatus in accordance with the present invention.

Figure 19:
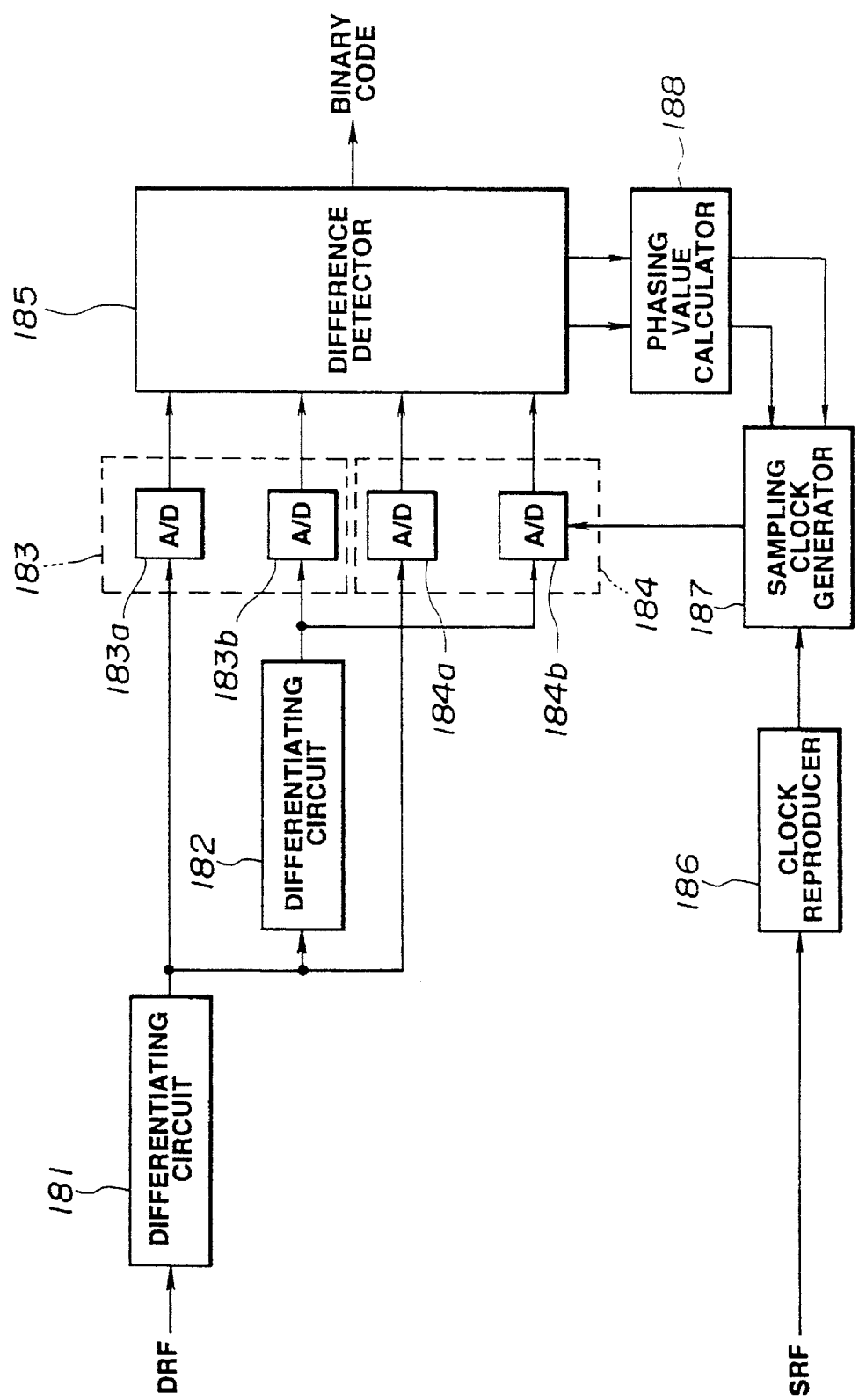
FIGS. 19 to 21 relate to the eighth embodiment of the present invention.

The signal reproducing apparatus of the eighth embodiment comprises, as shown in FIG. 19, a first differentiating circuit 181 for differentiating a magneto-optical reproduced signal DRF reproduced by an optical pickup that is not shown, a second differentiating circuit 182 for further differentiating an output signal of the first differentiating circuit 181 and providing a second-order differential signal, a leading edge A/D converter 183 composed of leading edge (leading edge of a mark formed) A/D converters 183*a* and 183*b* for sampling outputs of the first differentiating circuit 181 and second differentiating circuit 182 respectively, a trailing edge A/D converter 184 composed of trailing edge (trailing edge of a mark) A/D converters 184*a* and 184*b* for sampling outputs of the first differentiating circuit 181 and second differentiating circuit 182 respectively, a group of difference detectors 185 for analyzing samples provided by the leading edge A/D converter 183 and trailing edge A/D converter 184 so as to detect positions of bits that should be set to logical 1, a clock reproducer 186 for reproducing a channel clock using a reflected light intensity signal SRF detected by the optical pickup that is not shown, a sampling clock generator 187 that uses the channel clock reproduced by the clock reproducer 186 to generate sampling clocks to be used by the leading edge A/D converter 183 and trailing edge A/D converter 184, and a phasing value calculator 188 that uses samples provided by the A/D converters 183*b* and

184b, which correspond to bits having been set to logical 1 as a result of difference detection, to calculate a magnitude of phasing a sampling clock. The sampling clock generator 187 supplies independent sampling clock signals, which are out of phase with each other, to the leading edge A/D converter 183 and trailing edge A/D converter 184.

When a modulation method providing an even number of 1's; such as, 4/11 modulation is employed in combination with mark edge recording, the group of difference detectors 185 may be composed of a difference detector related to leading edges and a difference detector related to trailing edges. In 4/11 modulation, two leading edges and two trailing edges are dealt without fail. Two bits are selected in association with leading edges and two bits are selected in association with trailing edges.

In this embodiment, the group of difference detectors 185 shall be composed of a first difference detector 185a related to leading edges and a second difference detector 185b related to trailing edges.

Figure 20:
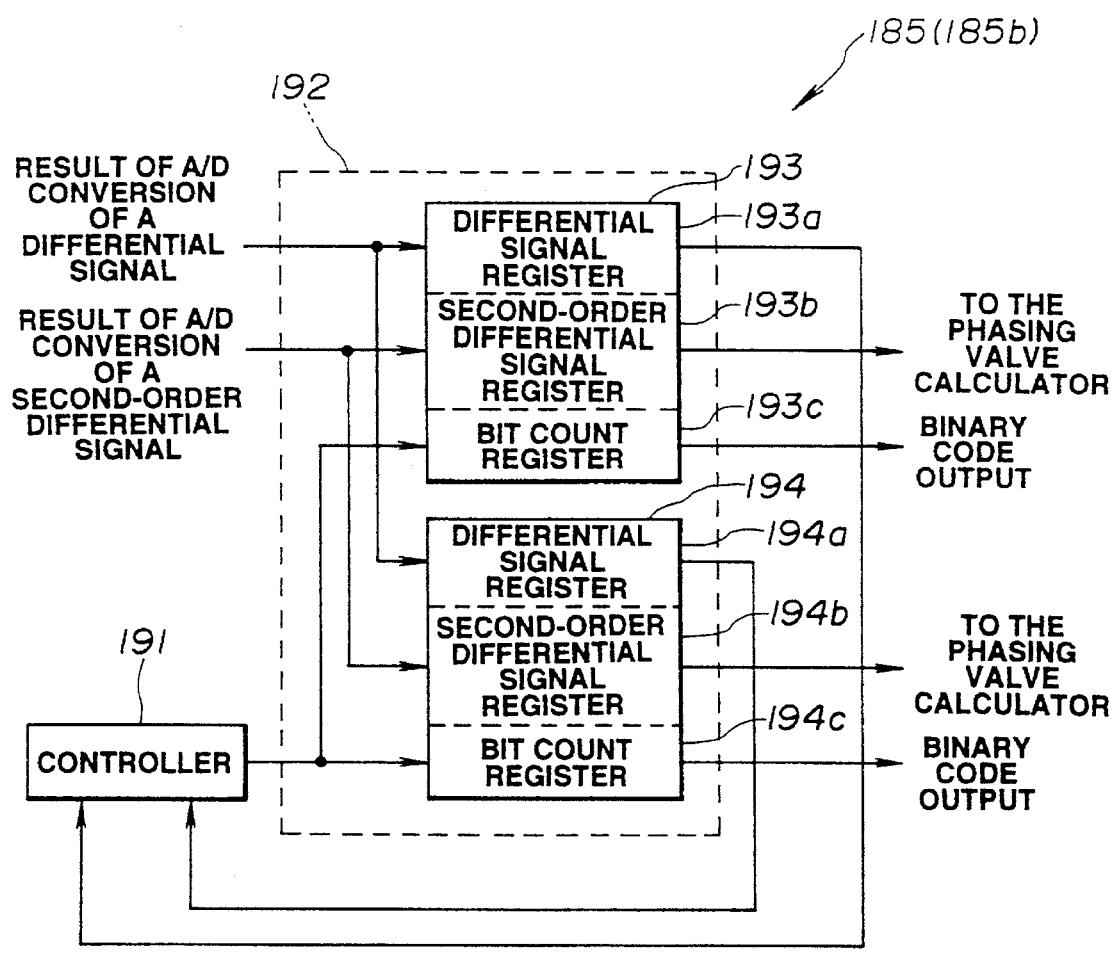

FIG. 20 shows one of the difference detectors constituting the group of difference detectors 185. The other difference detector has the same circuit elements as those shown in FIG. 20 except that the controller operates differently.

The difference detector 185a (185b) constituting the group of difference detectors 185 comprises, as shown in FIG. 20, a controller 191 for controlling an operation of difference detection, and a group of registers 192 for storing results of A/D conversion performed on a reproduced signal by the A/D converter 183 (184). The group of registers 192 is composed of two sets of registers 193 and 194. The sets of registers 193 and 194 include differential signal registers 193a and 194a for storing results of A/D conversion performed on a differential signal of a reproduced signal DRF, second-order differential signal registers 193b and 194b for storing results of A/D conversion performed on a second-order differential signal of the reproduced signal DRF, and bit count registers 193c and 194c for storing positions of bits in a block serving as a unit of modulation which signify the results of A/D conversion. The difference detector 185a (185b) operates in the same manner as that in the seventh embodiment, of which description will therefore be omitted.

According to the same procedure as that described in the seventh embodiment, the first difference detector 185a constituting the group of difference detectors 185 performs difference detection so as to detect two bits signifying the largest amplitudes of a differential signal of a reproduced signal DRF. The second difference detector 185b performs difference detection so as to detect two bits signifying the smallest amplitudes of the differential signal of the reproduced signal DRF. Binary codes (bit positions representing 1's) provided by the difference detectors 185a and 185b are synthesized, thus providing a finalized binary code.

Consequently, the group of difference detectors 185 selects a total of four bits signifying the largest absolute values of levels (largest differences from a zero level) of a differential signal of a reproduced signal.

Next, the operation of the signal reproducing apparatus of this embodiment will be described.

Based on a reflected light intensity signal SRF, the clock reproducer 186 reproduces a channel clock using clock pits on a disk as references similarly to that in the first embodiment. The sampling clock generator 187 generates clock signals by shifting the phase of the channel clock in response to an instruction sent from the phasing value calculator 188, and thus provides a leading edge sampling clock and a trailing edge sampling clock. The A/D converters 183a and 183b sample a differential signal of the reproduced signal DRF and a second-order signal thereof (outputs of the differentiating circuit 182) synchronously with the leading edge sampling clock. The A/D converters 184a and 184b sample the differential signal of the reproduced signal DRF and the second-order signal thereof synchronously with the trailing edge sampling clock. The results of A/D conversion are routed to the group of difference detectors 185. The group of difference detectors 185 selects two bits signifying the largest amplitudes of the differential signal of the reproduced signal DRF and two bits signifying the smallest amplitudes thereof (in edge recording, a differential signal of a reproduced signal is subjected to difference detection). This results in an output of a binary code. At the same time, the results of A/D conversion performed on the second-order differential signal, which correspond to two selected pairs of bits, are sent to the phasing value calculator 188. Thus, a magnitude of phasing the leading edge sampling clock and a magnitude of phasing the trailing edge sampling clock are calculated. The sampling clock generator 187 shifts the phases of the sampling clock signals by the magnitudes of phasing.

Figure 21:
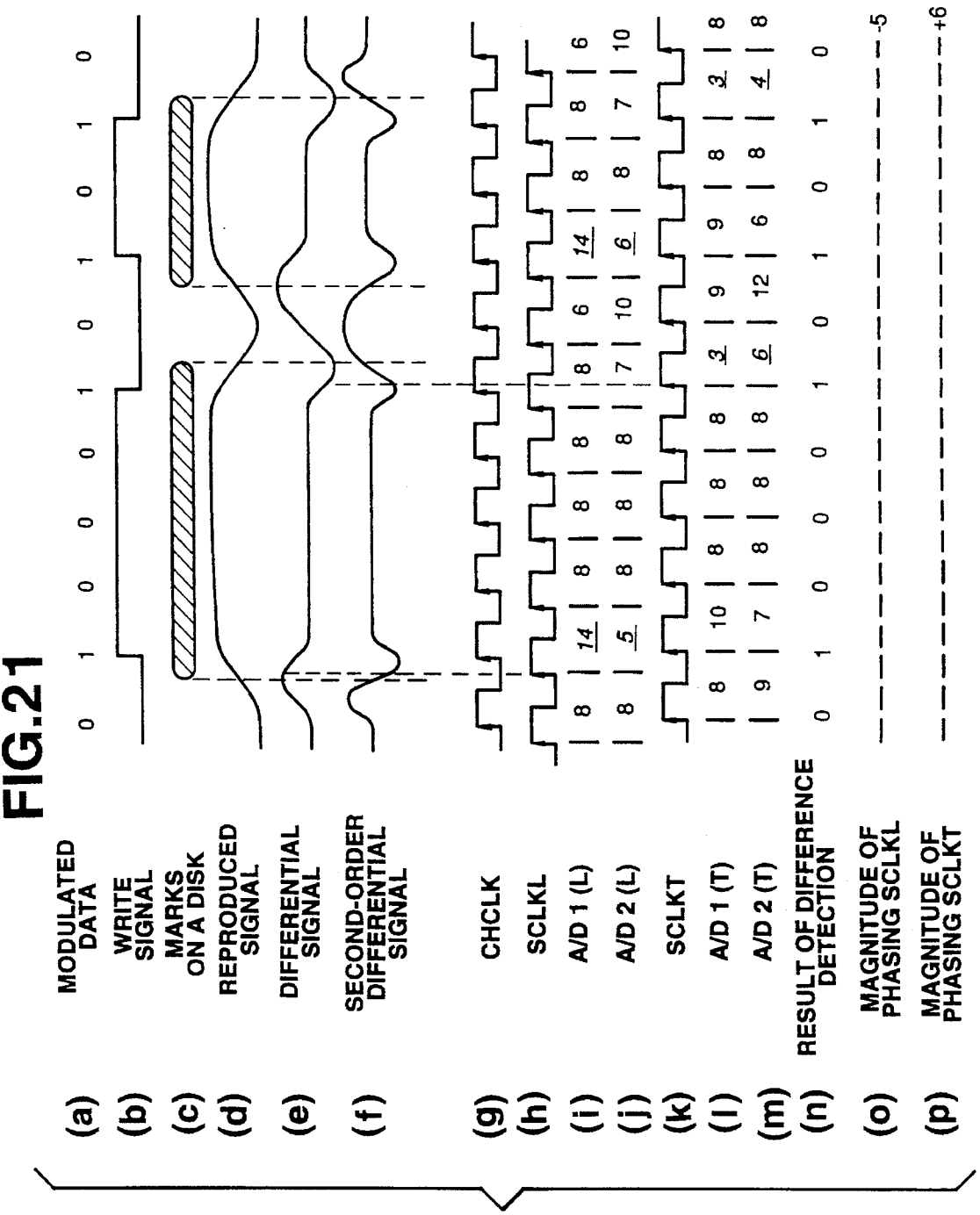

Next, the detailed actions of the signal reproducing apparatus of this embodiment will be described in conjunction with FIG. 21.

Discussed will be actions taken when data modulated in a 4/11 modulation mode similarly to that in the seventh embodiment (FIG. 21a) is recorded on a disk by mark edge recording in response to a write signal shown in FIG. 21b, and then slightly elongated marks are formed on the disk as shown in FIG. 21c (marks are liable to get longer when recording power is too high or an ambient temperature is rather high).

Reproducing from the disk on which the marks shown in FIG. 21c are formed results in a magneto-optical reproduced signal DRF shown in FIG. 21d. Thereafter, the differentiating circuit 181 differentiates the signal DRF so as to provide a differential signal shown in FIG. 21e. The differentiating circuit 182 differentiates the differential signal so as to provide a second-order differential signal (FIG. 21f).

On the other hand, a channel clock CHCLK shown in FIG. 21g is reproduced using clock pits pre-formed on the disk as references. Since the marks are formed elongated, the leading edges of the reproduced channel clock do not coincide with the edges of the marks. A leading edge sampling clock SCLKL and a trailing edge sampling clock SCLKT shall be pulsated as shown in FIGS. 21h and 21k (L shall be assigned to something related to leading edges, while T shall be assigned to something related to trailing edges).

The A/D converter 183 samples a differential signal and a second-order differential signal synchronously with the clock SCLKL and converts them into digital forms. The A/D converter 184 converts the differential signal and second-order differential signal into digital forms synchronously with the clock SCLKT. The results of conversion shall have the values shown in FIGS. 21i, 21j, 21l, and 21m.

The A/D conversion shall be performed in units of four bits. A value 8 is associated with a zero level of a signal, a value 15 is associated with a maximum level, and a value 0 is associated with a minimum level.

The group of difference detectors 185 performs difference detection on these results of A/D conversion. Consequently, bits signifying underlined values provided as the results of A/D conversion are set to logical 1. The resultant binary code is sent to a decoder that is not shown, whereby 4/11 demodulation is carried out (FIG. 21n). The results of A/D conversion performed on the second-order signal, which correspond to the bits representing 1's, are sent to the phasing value calculator 188.

The phasing value calculator 188 calculates a magnitude of phasing a sampling clock using the sent results of A/D conversion performed on the second-order signal. When the sampling clock is in phase with data (edge of a mark), the result of A/D conversion performed on the second-order differential signal has a value 8 associated with the zero level. When the sampling clock leads, if the sampling clock is a leading edge sampling clock, the result of A/D conversion has a value larger than 8. If the sampling clock is a trailing edge sampling clock, the result of A/D conversion has a value smaller than 8. In contrast, when the sampling clock lags, if the sampling clock is a leading edge sampling clock, the result of A/D conversion has a smaller value. If the sampling clock is a trailing edge sampling clock, the result of A/D conversion has a larger value.

A total of differences of the sent results of A/D conversion performed on the differential signal (values 5 and 6 when sampled synchronously with the leading edge sampling clock, and values 6 and 4 when sampled synchronously with the trailing edge sampling clock) from the value 8 associated with the zero level, for example, −5 when the values sampled synchronously with the leading edge sampling clock are concerned (FIG. 21o, SCLKL magnitude), and −6 when the values sampled synchronously with the trailing edge sampling clock are concerned (FIG. 21p, SCLKT magnitude) is indicative of a phase difference of a current sampling clock from optimal sampling timing.

The sampling clock generator 187 shifts the phases of the sampling clocks according to the magnitudes of phasing sent from the phasing value calculator 188. In the above example, values −5 and −6 have been sent. For the aforesaid reason, the leading edge sampling clock SCLKL lags optimal sampling timing, while the trailing edge sampling clock SCLKT leads optimal sampling timing. The leading edge sampling clock should therefore be led by a time interval proportional to the magnitude; that is, 5 ns (a delay relative to the clock CHCLK is reduced). The trailing edge sampling clock should be lagged by 6 ns.

The foregoing phase control is performed on each sampling clock for each block serving as a unit of modulation or demodulation, whereby the phase of each sampling clock always coincides with an edge position of each mark on a disk.

As mentioned above, according to this embodiment, when data is recorded or reproduced on or from a disk formatted in a sample servo mode using a mark edge recording technique, the phases of sampling clocks for use in difference detection are controlled in relation to a second-order differential signal made by differentiating a differential signal of a reproduced signal which is subjected to difference detection. This enables fine phase control while obviating the necessity of embedding a specific pattern for phasing to the start of each sector. In mark edge recording that permits high-density recording or reproducing by nature, higher-density recording or reproducing can be realized without diminishing a user-specific field. Consequently, a recording capacity-per-disk increases.

Since 4/11 modulation providing an even number of 1's for each block serving as a unit of modulation is adopted as a modulation technique, the difference detector can be composed of a leading edge difference detector and a trailing edge difference detector which are mutually independent.

The difference detectors can be constructed on a small scale and simply. Moreover, since the difference detectors are dedicated to leading and trailing edges respectively and use independent clocks, the phases of the clocks used for sampling and related to leading and trailing edges respectively can therefore be optimized. Consequently, the sampling clocks can be controlled so that a variation in mark length can be absorbed during mark edge recording. Furthermore, a register in a difference detector is constructed to store a differential signal and a second-order differential signal in a pair. Sample values of the second-order differential signal which correspond to bits set to logical 1 as a result of different detection can be retrieved effortlessly. This results in a simple circuitry and a simple control operation.

In the aforesaid embodiments, 4/11 modulation is adopted as a modulation technique. Aside from this technique, the present invention can apply to a modulation technique providing a fixed number of 1's for a certain range permitting difference detection without any change. Moreover, the present invention is not limited to a magneto-optical disk but may apply to a phase change disk or a pitting recording type disk.

In the eighth embodiment, a signal having a peak amplitude responsively to an edge of each mark, which is subjected to difference detection, is a signal made by electrically differentiating a reproduced signal. Alternatively, differentiation may be carried out optically in order to directly produce a reproduced signal having a peak amplitude responsively to an edge of each mark. This procedure has been disclosed in, for example, Japanese Patent Laid-Open No. 63-313335/1988.

When an electric circuit is employed for differentiation, since the electric circuit has a definite bandwidth, a differential wave provided by a differentiating circuit slightly lags an ideal differential wave. In order to compensate for the time lag, a magnitude of phasing may be obtained by calculating a difference of a sample value of a differential signal from a small offset value (for example, 9) but not from a value associated with a zero level. Alternatively, after a magnitude of phasing is calculated by following the procedure in the embodiment, a sampling clock generator may generate such a sampling clock that compensates for a time lag in a differentiating circuit.

A phase shift of a clock calculated using a differential signal may be multiplied by an appropriate gain and used as a magnitude of phasing the clock. Alternatively, a clock may not be phased continuously but a magnitude of phasing the clock may be varied on a fixed basis depending on whether the clock is leading or lagging. For producing a sampling clock using a channel clock, a delay line may not be used but a PLL may be constructed so that an offset is electrically developed in the PLL in order to shift the phase of the channel clock.

In the present invention, it will be apparent that a wide range of different working modes can be constructed on the basis of the invention without departing from the spirit and scope of the invention. This invention will be limited to the appended claims but not restricted to any specific working mode.

What is claimed is:

1. A signal detector for an optical information reproducing apparatus that reproduces a channel clock responsively to inherent marks formed on an optical recording medium, on which record data is recorded in the form of marks so that an edge of each mark is associated with a 1 after having been modulated so that the number of 1's resulting from modulation in a block, serving as a unit of modulation, becomes N (N is larger than 0 and an integer) and converted in an NRZI mode, and that then reproduces said record data from said optical recording medium synchronously with said channel clock, comprising:

signal detecting means for detecting a signal that has a peak amplitude corresponding to said edge of each mark;

sampling means for sampling an output of said signal detecting means synchronously with said channel clock; and differential detecting means for determining the N largest absolute values of output levels sampled by said sampling means and for selecting N bits, corresponding to the determined N largest absolute values.

2. A signal detector for an optical information reproducing apparatus according to claim 1, wherein:

said N equals to 2M (where, M is larger than 0 and an integer); and said differential detecting means includes:

a first difference detecting means for selecting M bits, which signify the largest values, from a channel code sampled by said sampling means; and a second difference detecting means for selecting M bits, which signify the smallest values, from a channel code sampled by said sampling means.

3. A signal detector for an optical information reproducing apparatus according to claim 2, further comprising:

first and second reference clock generating means for generating first and second reference clocks that have the same frequency as said channel clock and are out of phase with said channel clock; and first and second sampling means for sampling an output of said signal detecting means synchronously with said first and second reference clocks; and wherein:

said first difference detecting means selects M bits, which signify the largest values, from a channel code for said block sampled by said first sampling means; and said second difference detecting means selects M bits, which signify the smallest values, from a channel code for said block sampled by said second sampling means.

4. A signal detector for an optical information reproducing apparatus according to claim 3, wherein:

said first reference clock generating means includes a first delay means for delaying said channel clock and a first control means for controlling a delay set in said first delay means in accordance with an output of said first sampling means; and said second reference clock generating means includes a second delay means for delaying said channel clock and a second control means for controlling a delay set in said second delay means in accordance with an output of said second sampling means.

5. A signal detector for an optical information reproducing apparatus according to claim 4, wherein:

said first control means controls a delay set in said first delay means so that said first sampling means provides a maximum output responsively to a leading edge of each specific pattern on said optical recording medium; and said second control means controls a delay set in said second delay means so that said second sampling means provides a minimum output responsively to a trailing edge of each specific pattern on said optical recording medium .

6. A signal detector for an optical information reproducing apparatus according to claim 4, wherein:

said first control means performs phase control on a sampling clock used by said first sampling means according to a sample level of a differential signal of a signal to be subjected to difference detection which corresponds to a bit having been set to logical 1 by said first difference detecting means; and said second control means performs phase control on a sampling clock used by said first sampling means according to a sample level of a second-order differential signal of a reproduced signal which corresponds to a bit having been set to logical 1 by said second difference detecting means.

7. A signal detector for an optical information reproducing apparatus according to claim 6, wherein:

each of said first and second difference detecting means includes a memory means enabling to store in a pair a sample of said signal to be subjected to difference detection and a sample of a differential signal of said signal to be subjected to difference detection.

8. A signal detector for an optical information reproducing apparatus according to claim 2, wherein:

said first difference detecting means includes:

a first memory means numbering at least M and each storing in a pair a sample provided by said sampling means and a bit position signifying the sample;

a first selecting means for selecting said first memory means storing a sample, which represents a minimum value, from said first memory means numbering at least M; and a first determining means for comparing a latest sample provided by said sampling means with said sample stored in said first memory means selected by said first selecting means, and determining whether said sample stored in said first memory means selected by said first selecting means be updated with said latest sample; and said second difference detecting means includes:

a second memory means numbering at least M and each storing in a pair a sample provided by said sampling means and a bit position signifying the sample;

a second selecting means for selecting said second memory means storing a sample, which represents a maximum value, from said second memory means numbering at least M; and a second determining means for comparing a latest sample provided by said sampling means with said sample stored in said second memory means selected by said second selecting means, and determining whether said sample stored in said second memory means selected by said second selecting means be updated with said latest sample.

9. A signal detector for an optical information reproducing apparatus according to claim 8, wherein:

said first selecting means or said second selecting means selects said first memory means or said second memory means, which has been updated last, for a duration after said sample stored in any of said first memory means or said second memory means numbering at least M has been updated until said sample stored in any of said second memory means or said first memory means numbering at least M is updated.

10. A signal detector for an optical information reproducing apparatus according to claim 8, wherein:

said first selecting means or second selecting means selects an updated first memory means or an updated second memory means at a sampling instant immediately after said sample stored in any of said first memory means or said second memory means numbering at least M has been updated.

11. A signal detector for an optical information reproducing apparatus according to claim 1, wherein:

said record data is recorded on said optical recording medium after having been converted so that the number of 1's resulting from modulation for said block becomes a predetermined value and that continuation of 1's resulting from modulation is inhibited.

12. The signal detector of claim 1, wherein said differential detecting means determines the N largest absolute values of the last M output levels sampled by said sampling means, where M is larger than N and is an integer.

13. The signal detector of claim 12, wherein N equals 4 and M equals 11.

14. The signal detector of claim 12, wherein said differential detecting means assigns the selected N bits a binary value of 1 in a consecutive series of M bits, and assigns all other bits in the consecutive series of M bits a binary value of 0.

15. The signal detector of claim 1 wherein said sampling means outputs a value representative of an amplitude of the output of said signal detecting means.

16. The signal detector of claim 15, wherein said sampling means is an A/D converter.

* * * * *